(12) United States Patent
Holland

(10) Patent No.: US 11,644,890 B2
(45) Date of Patent: May 9, 2023

(54) IMAGE CAPTURING IN EXTENDED REALITY ENVIRONMENTS

(71) Applicant: QUALCOMM Incorporated, San Diego, CA (US)

(72) Inventor: Wesley James Holland, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 17/174,137

(22) Filed: Feb. 11, 2021

(65) Prior Publication Data
US 2022/0253126 A1      Aug. 11, 2022

(51) Int. Cl.
G06F 3/01        (2006.01)
G06N 20/20       (2019.01)
H04N 5/262       (2006.01)

(52) U.S. Cl.
CPC .............. *G06F 3/011* (2013.01); *G06F 3/017* (2013.01); *G06N 20/20* (2019.01); *H04N 5/2621* (2013.01)

(58) Field of Classification Search
CPC ......... G06F 3/011; G06F 3/017; G06N 20/20; H04N 5/2621
See application file for complete search history.

(56) References Cited

U.S. PATENT DOCUMENTS

| | | | | |
|---|---|---|---|---|
| 10,529,139 | B1 * | 1/2020 | Greene | G06T 13/40 |
| 2009/0175609 | A1 * | 7/2009 | Tan | G03B 15/00 |
| | | | | 396/77 |
| 2012/0274808 | A1 * | 11/2012 | Chong | H04N 5/2258 |
| | | | | 348/E9.053 |
| 2014/0354848 | A1 * | 12/2014 | Kim | H04N 5/232933 |
| | | | | 348/231.2 |
| 2015/0009349 | A1 * | 1/2015 | Kim | H04N 5/23229 |
| | | | | 348/218.1 |
| 2017/0278304 | A1 * | 9/2017 | Hildreth | G06F 3/04815 |
| 2018/0365484 | A1 * | 12/2018 | Yu | G06T 17/20 |
| 2019/0026936 | A1 * | 1/2019 | Gorur Sheshagiri | G06F 3/0304 |

(Continued)

FOREIGN PATENT DOCUMENTS

| | | |
|---|---|---|
| WO | 2014081394 A1 | 5/2014 |
| WO | 2020110323 A1 | 6/2020 |
| WO | 2020256969 A1 | 12/2020 |

OTHER PUBLICATIONS

"Face Me Part 2: Make Me an Avatar from a Selfie", Fxguide, 16 Pages, https://www.fxguide.com/fxfeatured/face-me-part-2-make-me-an-avatar-from-a-selfie/.

(Continued)

*Primary Examiner* — Yu Chen
(74) *Attorney, Agent, or Firm* — Polsinelli/Qualcomm

(57) ABSTRACT

Techniques and systems are provided for capturing self-images in extended reality environments. In some examples, a system captures a pose of a user of an extended reality system. The pose of the user includes a location of the user within a real-world environment associated with the extended reality system. The system also generates a digital representation of the user. The digital representation of the user reflects the pose of the user. The system further captures one or more frames of the real-world environment and overlays the digital representation of the user onto the one or more frames of the real-world environment.

59 Claims, 14 Drawing Sheets

(56) References Cited

U.S. PATENT DOCUMENTS

| | | | |
|---|---|---|---|
| 2019/0285881 A1* | 9/2019 | Ilic | G06T 19/006 |
| 2020/0074643 A1* | 3/2020 | Yamasaki | G06T 11/00 |
| 2020/0327378 A1* | 10/2020 | Smith | G06V 40/20 |
| 2021/0209854 A1* | 7/2021 | Booth | G06V 40/10 |
| 2021/0233325 A1* | 7/2021 | Kawakami | H04N 5/225 |
| 2022/0035439 A1* | 2/2022 | Holland | G06F 3/017 |
| 2022/0100271 A1* | 3/2022 | Hulbert | G06F 3/017 |
| 2022/0214743 A1* | 7/2022 | Dascola | G06F 3/011 |

OTHER PUBLICATIONS

Google Duo—Free High-Quality Video Calling App, 8 Pages, https://duo.google.com/about/.

International Search Report and Written Opinion—PCT/US2022/013379—ISA/EPO—dated Jul. 15, 2022.

* cited by examiner

700

---

Capture A Pose Of A User Of An Extended Reality System, The Pose Of The User Including A Location Of The User Within A Real-World Environment Associated With The Extended Reality System
702

↓

Generate A Digital Representation Of The User, The Digital Representation Of The User Reflecting The Pose Of The User
704

↓

Capture One Or More Frames Of The Real-World Environment
706

↓

Overlay The Digital Representation Of The User Onto The One Or More Frames Of The Real-World Environment
708

FIG. 7

IMAGE CAPTURING IN EXTENDED REALITY ENVIRONMENTS

FIELD

The present disclosure generally relates to techniques and systems for capturing images (such as self-images or "selfies") in extended reality environments.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Extended reality systems can allow users to experience extended reality environments by overlaying virtual content onto images of a real-world environment, which can be viewed by a user through an extended reality device (e.g., a head-mounted display, extended reality glasses, or other device). The real-world environment can include physical objects, people, or other real world objects. XR technology can be implemented in various applications and fields, including entertainment (e.g., gaming), teleconferencing, and education, among other applications and fields. Currently, XR systems are being developed to provide users the ability to capture photographs or videos of themselves (e.g., "selfies").

Some types of devices (such as mobile phones and tablets) are equipped with mechanisms for users to capture images of themselves. However, self-image capturing may be challenging for XR systems. For instance, XR devices worn on the head (e.g., head-mounted displays, XR glasses, and other devices) generally include cameras configured to capture scenes of the real-world environment. These cameras are positioned in an outward-facing direction (e.g., directed away from the user) and, therefore, the cameras are unable to capture images of the user. Further, cameras positioned inside an XR device (e.g., inward-facing cameras) may be unable to capture more than a small portion of a user's face or head. Some XR systems have been developed to facilitate self-image capturing. These XR systems can overlay an avatar of a user onto an image and/or video of the real-world environment. However, these avatars may have limited poses and/or expressions. Further, users may be required to manually position the avatars within images and/or videos. Accordingly, improved XR systems for self-image capturing are needed.

SUMMARY

Systems and techniques are described herein that can be implemented to capture self-images in extended reality environments. According to at least one example, apparatuses are provided for capturing self-images in extended reality environments. An example apparatus can include a memory (or multiple memories) and a processor or multiple processors (e.g., implemented in circuitry) coupled to the memory (or memories). The processor (or processors) is configured to: capture a pose of a user of an extended reality system, the pose of the user including a location of the user within a real-world environment associated with the extended reality system; generate a digital representation of the user, the digital representation of the user reflecting the pose of the user; capture one or more frames of the real-world environment; and overlay the digital representation of the user onto the one or more frames of the real-world environment.

Another example apparatus can include: means for capturing a pose of a user of an extended reality system, the pose of the user including a location of the user within a real-world environment associated with the extended reality system; means for generating a digital representation of the user, the digital representation of the user reflecting the pose of the user; means for capturing one or more frames of the real-world environment; and means for overlaying the digital representation of the user onto the one or more frames of the real-world environment.

In another example, methods for capturing self-images in extended reality environments are provided. An example method can include capturing a pose of a user of an extended reality system, the pose of the user including a location of the user within a real-world environment associated with the extended reality system. The method can also include generating a digital representation of the user, the digital representation of the user reflecting the pose of the user. The method can include capturing one or more frames of the real-world environment. The method can further include overlaying the digital representation of the user onto the one or more frames of the real-world environment.

In some aspects, the method can be performed by the extended reality system. In such aspects, the method can include: capturing, by an extended reality system, a pose of a user of the extended reality system, the pose of the user including a location of the user within a real-world environment associated with the extended reality system; generating, by the extended reality system, a digital representation of the user, the digital representation of the user reflecting the pose of the user; capturing, by the extended reality system, one or more frames of the real-world environment; and overlaying, by the extended reality system, the digital representation of the user onto the one or more frames of the real-world environment and presenting to the user using the extended reality system.

In another example, non-transitory computer-readable media are provided for capturing self-images in extended reality environments. An example non-transitory computer-readable medium can store instructions that, when executed by one or more processors, cause the one or more processors to: capture a pose of a user of an extended reality system, the pose of the user including a location of the user within a real-world environment associated with the extended reality system; generate a digital representation of the user, the digital representation of the user reflecting the pose of the user; capture one or more frames of the real-world environment; and overlay the digital representation of the user onto the one or more frames of the real-world environment.

In some aspects, overlaying the digital representation of the user onto the one or more frames of the real-world environment can include overlaying the digital representation of the user in a frame location corresponding to the location of the user within the real-world environment.

In some aspects, generating the digital representation of the user can be performed before capturing the one or more frames of the real-world environment. In some examples, the method, apparatuses, and computer-readable medium described above can include displaying, within a display of the extended reality system through which the real-world environment is visible, the digital representation of the user in a display location corresponding to the location of the user within the real-world environment. In one example, the method, apparatuses, and computer-readable medium described above can include: detecting user input corresponding to an instruction to capture the one or more frames of the real-world environment while the digital representation of the user is displayed within the display of the extended reality system; and capturing the one or more frames of the real-world environment based on the user input.

In some aspects, capturing the one or more frames of the real-world environment can be performed before capturing the pose of the user. In some examples, the method, apparatuses, and computer-readable medium described above can include displaying, within a display of the extended reality system on which the one or more frames of the real-world environment are displayed, the digital representation of the user in a display location corresponding to the location of the user within the real-world environment. In one example, the method, apparatuses, and computer-readable medium described above can include updating the display location of the digital representation of the user based on detecting a change in the location of the user within the real-world environment. In another example, the method, apparatuses, and computer-readable medium described above can include: detecting user input corresponding to an instruction to capture the pose of the user while the digital representation of the user is displayed within the display of the extended reality system; and capturing the pose of the user based on the user input.

In some aspects, the first digital representation is based on a first machine learning algorithm and the second digital representation of the user is based on a second machine learning algorithm. For instance, generating the digital representation of the user can include: generating a first digital representation of the user based on a first machine learning algorithm; and obtaining a second digital representation of the user based on a second machine learning algorithm. In some aspects, the second digital representation of the user can be a higher-fidelity digital representation of the user than the first digital representation of the user. For instance, in some examples, the method, apparatuses, and computer-readable medium described above can include: generating a first digital representation of the user of a first fidelity; and obtaining a second digital representation of the user of a second fidelity, wherein the second fidelity is higher than the first fidelity. In some examples, the method, apparatuses, and computer-readable medium described above can include: displaying the first digital representation of the user within a display of the extended reality system (e.g., using a current pose of the user) before the pose of the user is captured; generating the second digital representation of the user based on the pose of the user being captured; and overlaying the second digital representation of the user onto the one or more frames of the real-world environment. In other examples, the method, apparatuses, and computer-readable medium described above can include: displaying the first digital representation of the user (e.g., using the captured pose of the user) within a display of the extended reality system before the one or more frames of the real-world environment are captured; generating the second digital representation of the user based on the one or more frames of the real-world environment being captured; and overlaying the second digital representation of the user onto the one or more frames of the real-world environment. In some aspects, generating the first digital representation of the user can include implementing the first machine learning algorithm on the extended reality system. In some examples, obtaining the second digital representation of the user can include causing a server configured to generate digital representations of users to generate the second digital representation of the user based on implementing the second machine learning algorithm.

In some aspects, the method, apparatuses, and computer-readable medium described above can include: capturing a pose of a person within the real-world environment; generating a digital representation of the person, the digital representation of the person reflecting the pose of the person; and overlaying the digital representation of the user and the digital representation of the person onto the one or more frames of the real-world environment. In some examples, the digital representation of the person can be generated based at least in part on information associated with the digital representation of the person received from an extended reality system of the person. In some aspects, the information associated with the digital representation of the person can include a machine learning model trained to generate digital representations of the person.

In some aspects, the method, apparatuses, and computer-readable medium described above can include: capturing a plurality of poses of the user associated with a plurality of frames; generating a plurality of digital representations of the user corresponding to the plurality of frames; and overlaying the plurality of digital representations of the user onto the one or more frames of the real-world environment, the one or more frames of the real-world environment including a plurality of frames of the real-world environment.

In some aspects, the method, apparatuses, and computer-readable medium described above can include: generating the digital representation of the user using a first machine learning algorithm; and overlaying the digital representation of the user onto the one or more frames of the real-world environment using a second machine learning algorithm.

In some aspects, capturing the pose of the user can include capturing image data using an inward-facing camera system of the extended reality system. In some examples, capturing the pose of the user can include determining an expression of the user. In other examples, capturing the pose of the user can include determining a gesture of the user.

In some aspects, the method, apparatuses, and computer-readable medium described above can include determining the location of the user within the real-world environment based at least in part on generating a three-dimensional map of the real-world environment.

In some aspects, capturing the one or more frames of the real-world environment can include capturing image data using an outward-facing camera system of the extended reality system.

In some aspects, each apparatus described above is or includes a camera, a mobile device (e.g., a mobile telephone or so-called "smart phone" or other mobile device), a smart wearable device, an extended reality device (e.g., a virtual reality (VR) device, an augmented reality (AR) device, or a mixed reality (MR) device), a personal computer, a laptop computer, a server computer, a vehicle (e.g., an autonomous vehicle), or other device. In some aspects, the apparatus includes a camera or multiple cameras for capturing one or more videos and/or images. In some aspects, the apparatus further includes a display for displaying one or more videos and/or images. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures:

FIG. 7 is flow diagram of a process for self-image capturing in extended reality environments, in accordance with some examples;

DETAILED DESCRIPTION

Figure 1A:
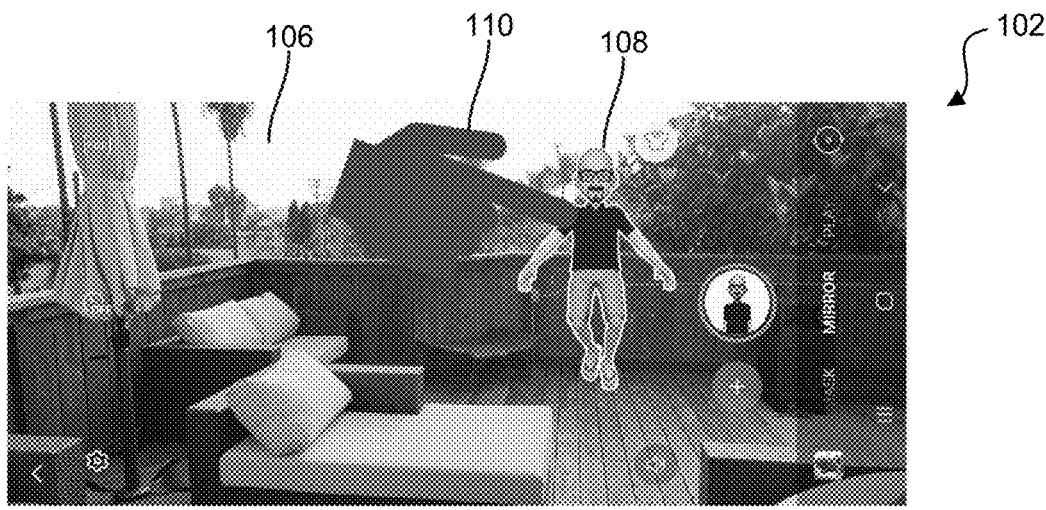
FIG. 1A, FIG. 1B, FIG. 1C, and FIG. 1D are illustrations of example avatars generated by extended reality systems, in accordance with some examples.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

As noted above, extended reality (XR) technologies can be used to present virtual content to users, and/or can combine real environments from the physical world and virtual environments to provide users with extended reality experiences. The term extended reality can encompass virtual reality (VR), augmented reality (AR), mixed reality (MR), and the like. XR systems can allow users to experience extended reality environments by overlaying virtual content onto images of a real-world environment, which can be viewed by a user through an extended reality device (e.g., a head-mounted display, extended reality glasses, or other device). The real-world environment can include physical objects, people, or other real world objects. XR technology can be implemented in various applications and fields, including entertainment (e.g., gaming), room designing and/or virtual shopping, food/health monitoring, video calling, teleconferencing, and education, among other applications and fields.

Some types of devices (such as mobile phones and tablets) are equipped with mechanisms for users to capture images of themselves (e.g., "self-images" or "selfies"). However, self-image capturing may be challenging for XR systems. For instance, XR devices worn on the head of a user (e.g., head-mounted displays, XR glasses, and other devices) generally include cameras configured to capture scenes of the real-world environment. These cameras are positioned in an outward-facing direction (e.g., directed away from the user) and, therefore, the cameras are unable to capture images of the user. Further, cameras positioned inside an XR device (e.g., inward-facing cameras) may be unable to capture more than a small portion of a user's face or head. Some XR systems have been developed to facilitate self-image capturing. These XR systems can overlay an avatar of a user onto an image and/or video of the real-world environment. However, the avatars may have limited poses and/or expressions. Further, users may be required to manually position the avatars within images and/or videos, resulting in unnatural (e.g., unrealistic) images and/or imprecise framing of the avatars with respect to the background.

The present disclosure describes systems, apparatuses, methods, and computer-readable media (collectively referred to as "systems and techniques") for performing image capturing in XR environments. In some aspects, the techniques and systems provide the ability for a head-mounted XR system to capture one or more self-images (e.g., photographs and/or videos) of a user wearing the head-mounted XR system. For example, the XR system can overlay a digital representation (e.g., an avatar or other type of digital representation) of the user on one or more frames captured by a forward-facing camera of the XR system. The digital representation of the user can reflect the pose of the user (e.g., gestures, limb positions, facial expressions, etc. of the user). The XR system can overlay the digital representation of the user within a frame such that the location of the digital representation corresponds to an actual location of the user within the real-world environment (e.g., the location of the user when the pose of the user was captured). Once the digital representation is overlaid within the frame, the frame may appear as if the user (e.g., the digital representation of the user) was facing the camera of the XR system when the frame was captured. In this way, the frame corresponds to a self-image (or "selfie") of the user.

In some cases, the process of generating a self-image of a user can involve at least two operations. One operation includes capturing one or more frames that are to be used as the background of the self-image. Another operation involves capturing the pose of the user to be incorporated into the digital representation (e.g., avatar or other digital representation) of the user. In some cases, the XR system can capture the pose of the user via one or more tracking capabilities of the XR system. The tracking capabilities of the XR system can include mechanisms and/or techniques for eye-tracking, 6-Degrees of Freedom (6DOF) position-tracking, hand-tracking, body-tracking, facial expression-tracking, any combination thereof, and/or other types of tracking. In some examples, capturing the pose of the user and incorporating the pose of the user into the digital representation (e.g., avatar) can be referred to as "puppeteering" of the digital representation of the user. The two operations for generating a self-image can be performed serially (e.g., one operation after the other operation). Further, the operations can be performed in any order. For example, the background frames can be captured before the pose of the user is captured, or the pose of the user can be captured before the background frames are captured. Specific processes for implementing the operations can vary based on the order of the operations. In some cases, after detecting user input corresponding to initiation of a self-image capture mode, the XR system can direct the user to perform the operations in a certain order. In other cases, the XR system can detect user input corresponding to a preferred order.

In a first use-case scenario, the digital representation (e.g., avatar) is puppeteered before the background frame is captured. In this scenario, the XR system can capture the pose of the user and generate a digital representation of the user that reflects the captured pose of the user. In some cases, the XR system can render the digital representation within a display of the XR system. For instance, the XR system can position the digital representation within the display such that the digital representation appears to be located at the same location within the real-world environment as the user when the state of the user was captured. As the user moves within the real-world environment, the portion of the real-world environment visible through the display of the XR system (e.g., the scene) changes, but the digital representation appears to remain at the same location. In this way, the digital representation of the user is "world-locked." To determine the location of the user when the state of the user was captured, the XR system can map the environment using one or more mapping and/or localization techniques including computer vision-based tracking, model-based tracking, simultaneous localization and mapping (SLAM) techniques, any combination thereof, and/or other mapping and/or localization techniques. After the XR system generates the avatar or other digital representation of the user (the second operation noted above), the XR system can capture a frame that is to be the background of the self-image (the first operation noted above). For example, the user can move within the environment while the digital representation (e.g., avatar) is rendered on the display of the XR system. When the user determines that the view through the display is an appropriate and/or desired background for the self-image, the user can direct the XR system to capture a frame of the environment. The XR system can then generate a composite frame in which the digital representation of the user is overlaid onto the captured frame of the environment.

In a second use-case scenario, the background frame is captured before the digital representation of the user is puppeteered. In this scenario, the XR system can capture a frame of the real-world environment at the direction of the user. In some cases, the background frame is rendered within a portion of the display of the XR system (e.g., within a preview window). After the background frame is captured and/or rendered within the preview window (the first operation noted above), the XR system can puppeteer an avatar or other digital representation of the user based on the pose of the user (the second operation noted above). For instance, the XR system can render an avatar within the preview window (e.g., at a predetermined location). As the user moves within the environment, the XR system can move the avatar to a corresponding location within the preview window. In this way, the avatar is "head-locked." When the user is satisfied with their location and/or pose, the user can direct the XR system to capture the pose of the user. The XR system can then generate a composite frame in which the digital representation (e.g., avatar) of the user is overlaid onto the captured frame of the environment.

In a third use-case scenario, the XR system can generate a self-image with multiple frames (e.g., a video). In one example of this scenario, the XR system can generate a video by puppeteering a digital representation of the user (e.g., an avatar representing the user) before capturing the background frames. For instance, the XR system can capture the pose of the user for a period of time and generate digital representation of the user (e.g., an avatar) that reflects any changes in the pose of the user during the period of time. The period of time can correspond to a predetermined period of time, a predetermined number of frames, or a period of time specified by the user. The XR system can then record frames of the real-world environment for the same period of time. The scene of the real-world environment can remain constant throughout the period of time, or the scene can change (e.g., the user can move within the environment while the frames are captured). In some cases, the XR system can render the digital representation of the user within the display of the XR system while the XR system records frames of the environment. For example, the XR system can render the digital representation of the user such that the digital representation appears to be at the same location(s) as the user when the pose of the user was captured (e.g., the digital representation of the user is world-locked). In another example of this use-case scenario, the XR system can generate a video by capturing a background frame before puppeteering the digital representation of the user. For instance, the XR system can capture a frame of the environment to be a static background of the video. The XR system can then capture the pose of the user for a period of time and generate the digital representation of the user (e.g., avatar) that reflects any changes in the pose of the user during the period of time. As the user moves within the environment during the period of time, the XR system can display the digital representation of the user with corresponding movements and/or pose within a preview window that includes the frame. In this example, the digital representation of the user (e.g., the avatar representing the user) is head-locked.

In a fourth use-case scenario, the XR system can generate a self-image that includes multiple people. In one example of this scenario, the XR system can capture the pose of the user while the user poses with one or more people. The XR system can then capture a background frame that includes the one or more people. For instance, the user can move within the environment to face the one or more people while the one or more people remain in their original poses. The XR system can then insert a digital representation (e.g., an avatar) reflecting the state of the user into the background frame. In another example of this use-case scenario, each person to be included within the self-image is wearing a head-mounted XR system. In this example, each XR system can capture the pose of the corresponding person and generate an digital representation (e.g., an avatar) that reflects the pose of the person. In addition, one of the XR systems can capture a background frame. The XR system capturing the background frame can send requests to the other XR systems for the digital representations (e.g., avatars) generated by the other XR systems. The XR system can then combine the background frame and the digital representations. In this example, the background frame can be captured before the digital representations are generated, or the digital representations can be generated before the background frame is captured.

The XR system can generate an avatar or other digital representation of the user in various ways. In some examples, the XR system can capture one or more frames of the user (e.g., one or more full-body images of the user). The frame(s) can be input to a model that generates a digital representation based on physical features detected within the frame(s). In some cases, the model can be trained to adapt the digital representation of the user based on the captured pose of the user. For instance, if the XR system determines that the user is waving, the model can generate a digital representation that resembles the user waving, even if the model does not have an actual image of the user waving. In one example, the model can be a machine learning model, such as a neural network. In a non-limiting example, the model can be a generative adversarial network (GAN). In some cases, the XR system can generate an initial digital representation (e.g., avatar) of the user. For instance, the initial digital representation of the user can be rendered within the display of the XR system while the XR system is capturing the background frame and/or pose of the user. Once the pose of the user and/or the placement of the digital representation within the background frame is confirmed, the XR system can replace the initial digital representation with digital representation of the user (e.g., a final avatar for the user). In some cases, the final digital representation can be higher-quality (e.g., more realistic) than the initial digital representation. For instance, an initial avatar can appear cartoon-like and a final avatar can be photo-realistic (or approximately photo-realistic). Because generating a photo-realistic digital representation can involve large amounts of time and/or processing power, using a relatively low-quality initial digital representation can reduce latencies and/or the workload of the XR system during the process of generating a self-image.

Figure 1B:
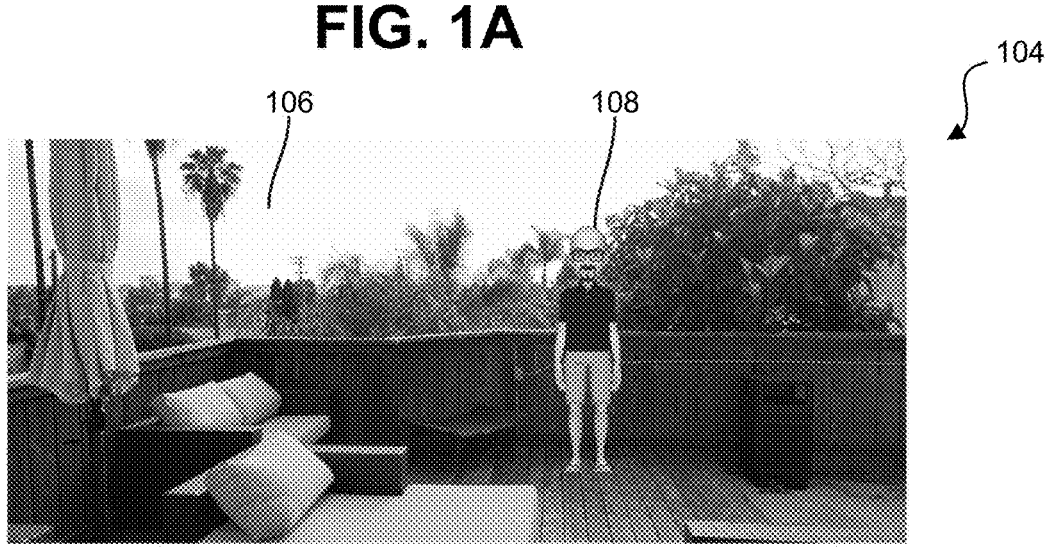
Figure 1C:
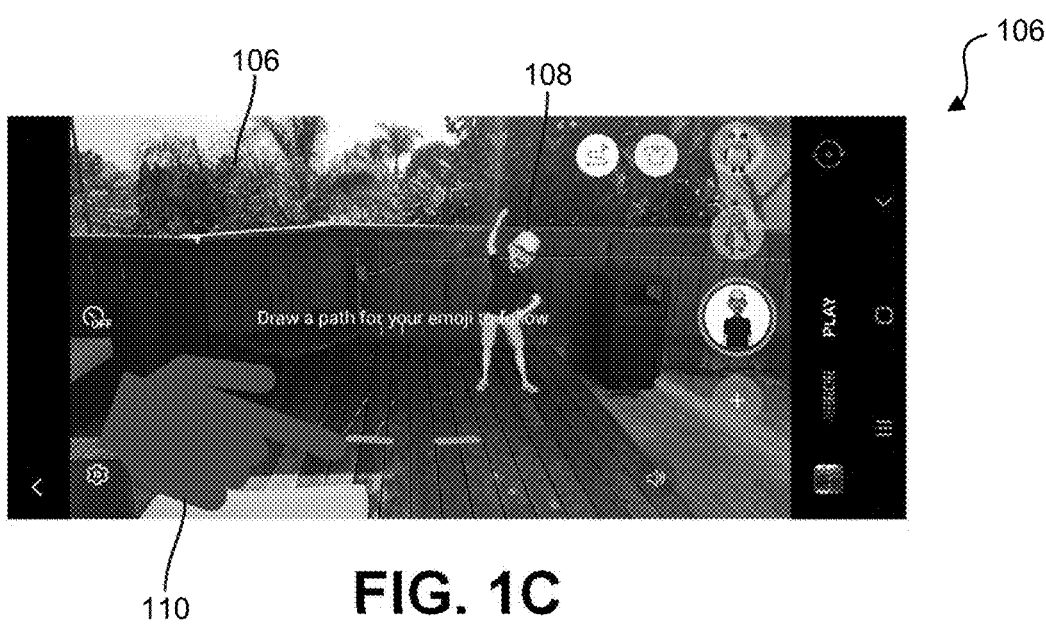
Figure 1D:
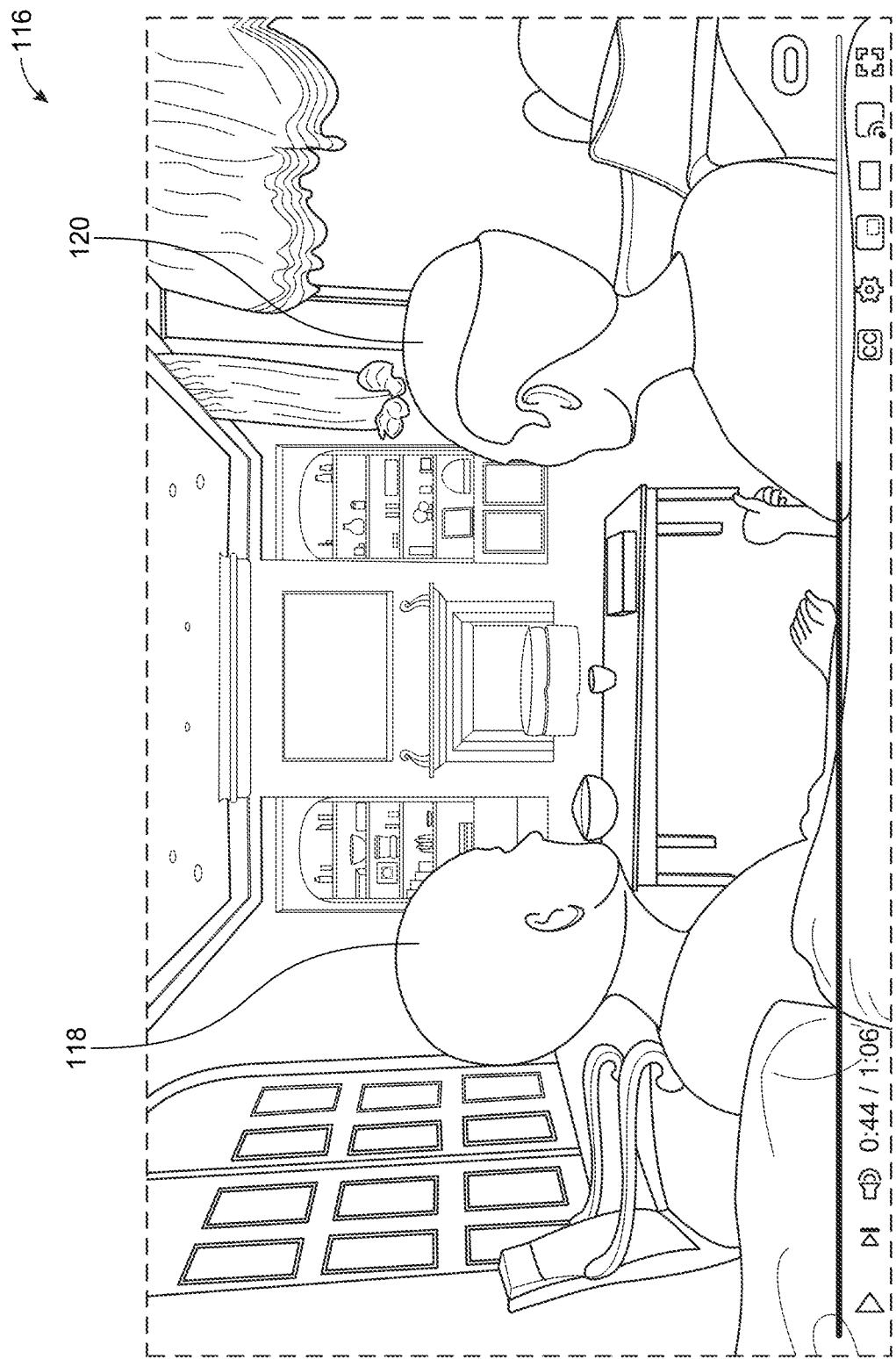

Various aspects of the application will be described with respect to the figures. FIG. 1A, FIG. 1B, and FIG. 1C provide illustrations of example avatars that can be generated by some existing XR systems. For instance, FIG. 1A shows a self-image frame 102 including an avatar 108 overlaid onto a background frame 106. In one example, an XR system can generate the avatar 108 by inputting one or more images of the user into a model (e.g., a machine-learning based model) trained to generate avatars whose physical appearances correspond to the physical appearances of users. As shown, the avatar 108 can be a cartoon-like representation or other abstract representation of the user (rather than a photo-realistic or approximately photo-realistic representation of the user). In some cases, the XR system can require and/or direct the user to position the avatar 108 at a selected location within the background frame 106. For instance, the XR system can provide a positioning tool 110 shown in FIG. 1A that enables the user to change the position of the avatar 108 by dragging the positioning tool 110 within the background frame 106. A self-image frame 104 shown in FIG. 1B illustrates the avatar 108 after the avatar 108 has been positioned using the positioning tool 110. In some cases, the self-image capturing system can enable the user to customize the self-image frame 104 by selecting a pose (e.g., a gesture, emotion, expression, movement, etc.) for the avatar 108. For example, the self-image capturing system can provide a menu or list of pre-determined and/or pre-configured poses and detect user input corresponding to a selection. Further, in some cases, the self-image capturing system can enable the user to animate the avatar 108 within the background frame 106. For example, as shown in FIG. 1C, the self-image capturing system can enable the user to draw a path for the avatar 108 using the positioning tool 110. Based on user input corresponding to the path, self-image capturing system can generate a video that shows the avatar 108 moving along the path. FIG. 1D is an illustration of other example avatars that can be generated by some existing XR systems. For instance, FIG. 1D shows a frame 116 that includes two avatars (e.g., avatars 118 and 120). In this example, users corresponding to the avatars 118 and 120 can view both avatars within the displays of XR devices (e.g., HMDs) worn by the users.

In some cases, the XR systems configured to generate the avatars illustrated in FIGS. 1A-1D can have various limitations that make the XR systems unsuitable and/or undesirable for generating self-images of users wearing HMDs or other types of XR devices. For instance, the XR systems can involve (e.g., require) manual user input to position an avatar within a frame. As a result, frames including the rendered avatars may not appear to be natural or realistic "selfies." Further, the rendered avatars may not accurately reflect the current (e.g., actual) pose of the users. Moreover, due to the extensive computing resources involved in rendering avatars, the avatars generated by these XR systems may be low-quality (e.g., low-fidelity).

Figure 2:
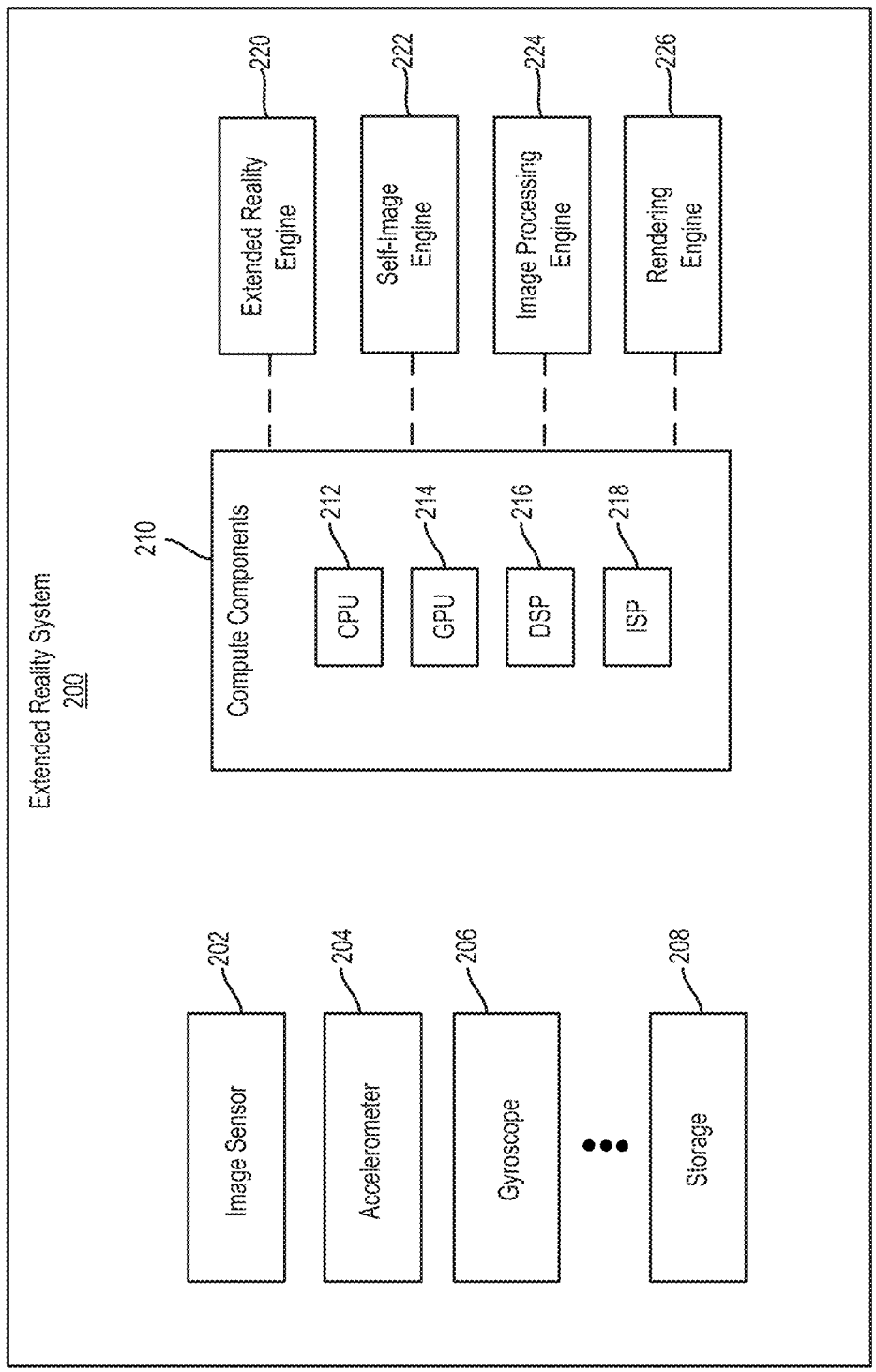
FIG. 2 is a block diagram illustrating an example architecture of an extended reality system, in accordance with some examples.

FIG. 2 is a diagram illustrating an example extended reality system 200, in accordance with some aspects of the disclosure. The extended reality system 200 can be part of, or implemented by, a single computing device or multiple computing devices. In some cases, the extended reality system 200 can be part of, or implemented by, an XR system or device. For instance, the extended reality system 200 can run (or execute) XR applications and implement XR operations. The XR system or device that includes and/or implements the extended reality system 200 can be an XR head-mounted display (HMD) device (e.g., a virtual reality (VR) headset, an augmented reality (AR) headset, or an mixed reality (MR) headset), XR glasses (e.g., AR glasses), among other XR systems or devices. In some examples, the extended reality system 200 can be part of, or implemented by, any other device or system, such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a network-connected television (or so-called "smart" television), a display device, a gaming console, a video streaming device, an Internet-of-Things (IoT) device, a vehicle (or computing device of a vehicle), and/or any other suitable electronic device(s).

In some examples, the extended reality system 200 can perform tracking and localization, mapping of the physical world (e.g., a scene), and positioning and rendering of virtual content on a display (e.g., a screen, visible plane/region, and/or other display) as part of an XR experience. For example, the extended reality system 200 can generate a map (e.g., 3D map) of a scene in the physical world, track a pose (e.g., location and position) of the extended reality system 200 relative to the scene (e.g., relative to the 3D map of the scene), position and/or anchor virtual content in a specific location(s) on the map of the scene, and render the virtual content on the display. The extended reality system 200 can render the virtual content on the display such that the virtual content appears to be at a location in the scene corresponding to the specific location on the map of the scene where the virtual content is positioned and/or anchored. In some examples, the display can include a glass, a screen, a lens, and/or other display mechanism that allows a user to see the real-world environment and also allows XR content to be displayed thereon.

As shown in FIG. 2, the extended reality system 200 can include one or more image sensors 202, an accelerometer 204, a gyroscope 206, storage 208, compute components 210, an XR engine 220, a self-image engine 222, an image processing engine 224, and a rendering engine 226. It should be noted that the components 202-226 shown in FIG. 2 are non-limiting examples provided for illustrative and explanation purposes, and other examples can include more, less, or different components than those shown in FIG. 2. For example, in some cases, the extended reality system 200 can include one or more other sensors (e.g., one or more inertial measurement units (IMUs), radars, light detection and ranging (LIDAR) sensors, audio sensors, etc.), one or more display devices, one more other processing engines, one or more other hardware components, and/or one or more other software and/or hardware components that are not shown in FIG. 2. An example architecture and example hardware components that can be implemented by the extended reality system 200 are further described below with respect to FIG. 10.

For simplicity and explanation purposes, the one or more image sensors 202 will be referenced herein as an image sensor 202 (e.g., in singular form). However, one of ordinary skill in the art will recognize that the extended reality system 200 can include a single image sensor or multiple image sensors. Also, references to any of the components (e.g., 202-226) of the extended reality system 200 in the singular or plural form should not be interpreted as limiting the number of such components implemented by the extended reality system 200 to one or more than one. For example, references to an accelerometer 204 in the singular form should not be interpreted as limiting the number of accelerometers implemented by the extended reality system 200 to one. One of ordinary skill in the art will recognize that, for any of the components 202-226 shown in FIG. 2, the extended reality system 200 can include only one of such component(s) or more than one of such component(s).

The extended reality system 200 can include or be in communication with (wired or wirelessly) an input device. The input device can include any suitable input device, such as a touchscreen, a pen or other pointer device, a keyboard, a mouse a button or key, a microphone for receiving voice commands, a gesture input device for receiving gesture commands, any combination thereof, and/or other input device. In some cases, the image sensor 202 can capture images that can be processed for interpreting gesture commands.

The extended reality system 200 can be part of, or implemented by, a single computing device or multiple computing devices. In some examples, the extended reality system 200 can be part of an electronic device (or devices) such as an extended reality head-mounted display (HMD) device, extended reality glasses (e.g., augmented reality or AR glasses), a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an Internet-of-Things (IoT) device, and/or any other suitable electronic device(s).

In some implementations, the one or more image sensors 202, the accelerometer 204, the gyroscope 206, storage 208, compute components 210, the XR engine 220, the self-image engine 222, the image processing engine 224, and the rendering engine 226 can be part of the same computing device. For example, in some cases, the one or more image sensors 202, the accelerometer 204, the gyroscope 206, storage 208, compute components 210, the XR engine 220, the self-image engine 222, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 208, compute components 210, the XR engine 220, the self-image engine 222, the image processing engine 224, and the rendering engine 226 can be part of two or more separate computing devices. For example, in some cases, some of the components 202-226 can be part of, or implemented by, one computing device and the remaining components can be part of, or implemented by, one or more other computing devices.

The storage 208 can be any storage device(s) for storing data. Moreover, the storage 208 can store data from any of the components of the extended reality system 200. For example, the storage 208 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the self-image engine 222, data from the image processing engine 224, and/or data from the rendering engine 226 (e.g., output frames). In some examples, the storage 208 can include a buffer for storing frames for processing by the compute components 210.

The one or more compute components 210 can include a central processing unit (CPU) 212, a graphics processing unit (GPU) 214, a digital signal processor (DSP) 216, and/or an image signal processor (ISP) 218. The compute components 210 can perform various operations such as image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, and any of the various operations described herein. In this example, the compute components 210 implement the XR engine 220, the self-image engine 222, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the self-image engine 222, the image processing engine 224, and/or the rendering engine 226 as described herein.

In some examples, the image sensor 202 can capture image data and can generate frames based on the image data and/or can provide the image data or frames to the XR engine 220, the self-image engine 222, the image processing engine 224, and/or the rendering engine 226 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

In some cases, the image sensor 202 (and/or other image sensor or camera of the extended reality system 200) can be configured to also capture depth information. For example, in some implementations, the image sensor 202 (and/or other camera) can include an RGB-depth (RGB-D) camera. In some cases, the extended reality system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in a same general location the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

As noted above, in some cases, the extended reality system 200 can also include one or more sensors (not shown) other than the image sensor 202. For instance, the one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the extended reality system 200 and can generate acceleration measurements based on the detected acceleration. In some cases, the accelerometer 204 can provide one or more translational vectors (e.g., up/down, left/right, forward/back) that can be used for determining a position or pose of the extended reality system 200. The gyroscope 206 can detect and measure the orientation and angular velocity of the extended reality system 200. For example, the gyroscope 206 can be used to measure the pitch, roll, and yaw of the extended reality system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the extended reality system 200. As previously noted, in other examples, the extended reality system 200 can also include other sensors, such as an inertial measurement unit (IMU), a magnetometer, a machine vision sensor, a smart scene sensor, a speech recognition sensor, an impact sensor, a shock sensor, a position sensor, a tilt sensor, etc.

In some cases, the one or more sensors can include at least one IMU. An IMU is an electronic device that measures the specific force, angular rate, and/or the orientation of the extended reality system 200, using a combination of one or more accelerometers, one or more gyroscopes, and/or one or more magnetometers. In some examples, the one or more sensors can output measured information associated with the capture of an image captured by the image sensor 202 (and/or other camera of the extended reality system 200) and/or depth information obtained using one or more depth sensors of the extended reality system 200.

The output of one or more sensors (e.g., the accelerometer 204, the gyroscope 206, one or more IMUs, and/or other sensors) can be used by the extended reality engine 220 to determine a pose of the extended reality system 200 (also referred to as the head pose) and/or the pose of the image sensor 202 (or other camera of the extended reality system 200). In some cases, the pose of the extended reality system 200 and the pose of the image sensor 202 (or other camera) can be the same. The pose of image sensor 202 refers to the position and orientation of the image sensor 202 relative to a frame of reference. In some implementations, the camera pose can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some cases, a device tracker (not shown) can use the measurements from the one or more sensors and image data from the image sensor 202 to track a pose (e.g., a 6DOF pose) of the extended reality system 200. For example, the device tracker can fuse visual data (e.g., using a visual tracking solution) from captured image data with inertial measurement data to determine a position and motion of the extended reality system 200 relative to the physical world (e.g., the scene) and a map of the physical world. As described below, in some examples, when tracking the pose of the extended reality system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the extended reality system 200 within the scene and the 3D map of the scene, etc. The 3D map can provide a digital representation of a scene in the real/physical world. In some examples, the 3D map can anchor location-based objects and/or content to real-world coordinates and/or objects. The extended reality system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the extended reality system 200 as a whole can be determined and/or tracked by the compute components 210 using a visual tracking solution based on images captured by the image sensor 202 (and/or other camera of the extended reality system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM engine (not shown). SLAM refers to a class of techniques where a map of an environment (e.g., a map of an environment being modeled by extended reality system 200) is created while simultaneously tracking the pose of a camera (e.g., image sensor 202) and/or the extended reality system 200 relative to that map. The map can be referred to as a SLAM map, and can be 3D. The SLAM techniques can be performed using color or grayscale image data captured by the image sensor 202 (and/or other camera of the extended reality system 200), and can be used to generate estimates of 6DOF pose measurements of the image sensor 202 and/or the extended reality system 200. Such a SLAM technique configured to perform 6DOF tracking can be referred to as 6DOF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DOF SLAM (e.g., 6DOF tracking) can associate features observed from certain input images from the image sensor 202 (and/or other camera) to the SLAM map. For example, 6DOF SLAM can use feature point associations from an input image to determine the pose (position and orientation) of the image sensor 202 and/or extended reality system 200 for the input image. 6DOF mapping can also be performed to update the SLAM map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the image sensor 202 and/or the extended reality system 200 can be determined by projecting features from the 3D SLAM map into an image or video frame and updating the camera pose from verified 2D-3D correspondences.

In one illustrative example, the compute components 210 can extract feature points from every input image or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The features points in key frames either match (are the same or correspond to) or fail to match the features points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some cases, the extended reality system 200 can also track the hand and/or fingers of a user to allow the user to interact with and/or control virtual content in a virtual environment. For example, the extended reality system 200 can track a pose and/or movement of the hand and/or fingertips of the user to identify or translate user interactions with the virtual environment. The user interactions can include, for example and without limitation, moving an item of virtual content, resizing the item of virtual content and/or a location of the virtual private space, selecting an input interface element in a virtual user interface (e.g., a virtual representation of a mobile phone, a virtual keyboard, and/or other virtual interface), providing an input through a virtual user interface, etc.

The operations for the XR engine 220, the self-image engine 222, the image processing engine 224, and the rendering engine 226 can be implemented by any of the compute components 210. In one illustrative example, the operations of the rendering engine 226 can be implemented by the GPU 214, and the operations of the XR engine 220, the self-image engine 222, and the image processing engine 224 can be implemented by the CPU 212, the DSP 216, and/or the ISP 218. In some cases, the compute components 210 can include other electronic circuits or hardware, computer software, firmware, or any combination thereof, to perform any of the various operations described herein.

In some examples, the XR engine 220 can perform XR operations to generate an XR experience based on data from the image sensor 202, the accelerometer 204, the gyroscope 206, and/or one or more sensors on the extended reality system 200, such as one or more IMUs, radars, etc. In some examples, the XR engine 220 can perform tracking, localization, pose estimation, mapping, content anchoring operations and/or any other XR operations/functionalities. An XR experience can include use of the extended reality system 200 to present XR content (e.g., virtual reality content, augmented reality content, mixed reality content, etc.) to a user during a virtual session. In some examples, the XR content and experience can be provided by the extended reality system 200 through an XR application (e.g., executed or implemented by the XR engine 220) that provides a specific XR experience such as, for example, an XR gaming experience, an XR classroom experience, an XR shopping experience, an XR entertainment experience, an XR activity (e.g., an operation, a troubleshooting activity, etc.), among others. During the XR experience, the user can view and/or interact with virtual content using the extended reality system 200. In some cases, the user can view and/or interact with the virtual content while also being able to view and/or interact with the physical environment around the user, allowing the user to have an immersive experience between the physical environment and virtual content mixed or integrated with the physical environment.

The self-image engine 222 can perform various operations associated with capturing self-images. In some cases, the self-image engine 222 can generate a self-image by combining an avatar of a user (or another type of digital representation of the user) and one or more background frames. For instance, the self-image engine 222 (in conjunction with one or more other components of the extended reality system 200) can perform a multi-operation self-image capturing process. One operation of the self-image capturing process can involve capturing one or more frames of the real-world environment in which the extended reality system 200 is located. Another operation of the self-image capturing process can involve generating an avatar that reflects a captured pose (e.g., an expression, gesture, posture, location, etc.) of the user. A further operation of the self-image capturing process can involve combining the avatar and the one or more frames of the real-world environment. As will be explained in more detail below, the self-image engine 222 can perform the operations of the multi-operation self-image capturing process in various orders and/or ways.

Figure 3A:
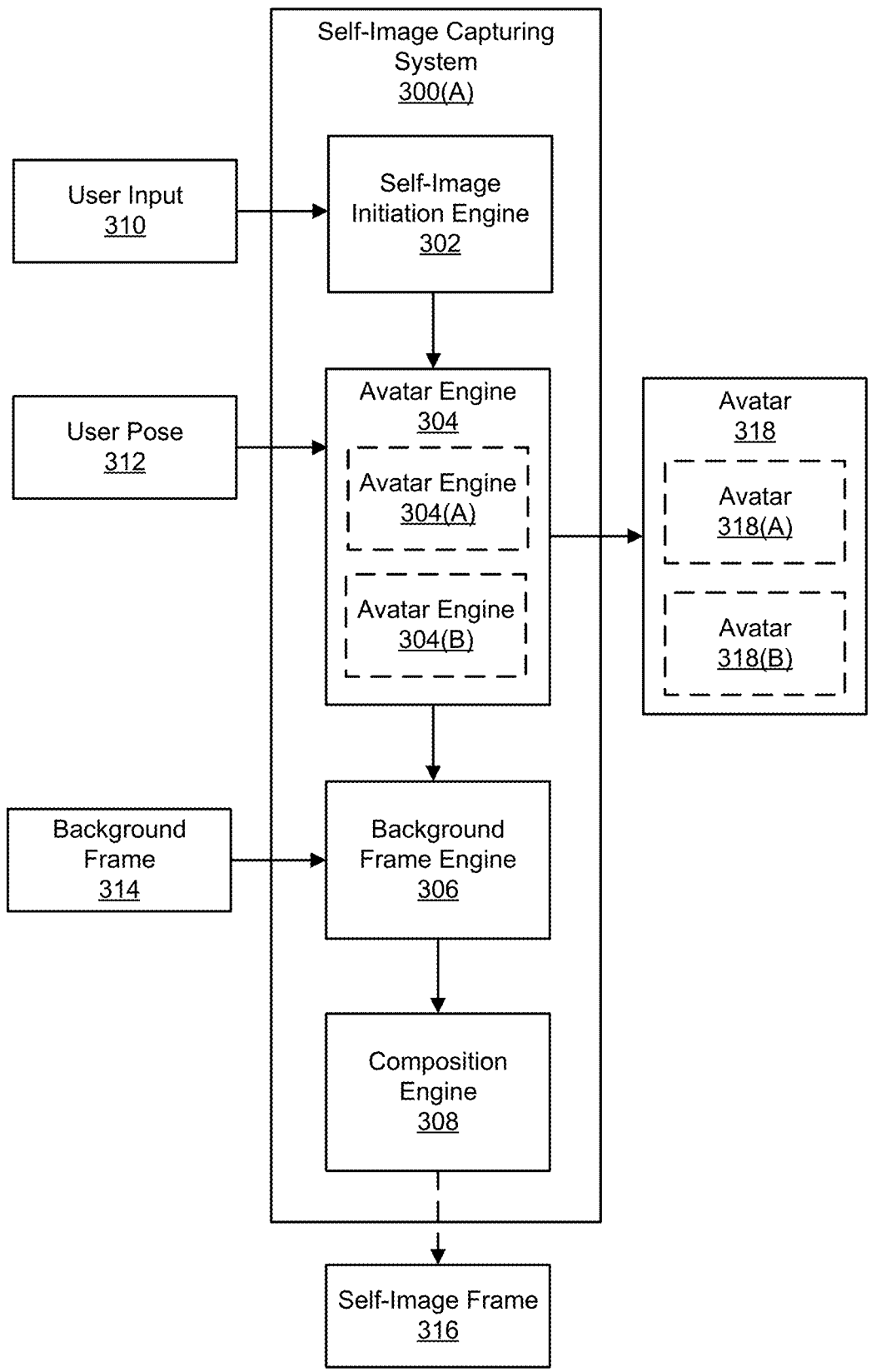
FIG. 3A and FIG. 3B are block diagrams of example systems for self-image capturing in extended reality environments, in accordance with some examples.
Figure 3B:
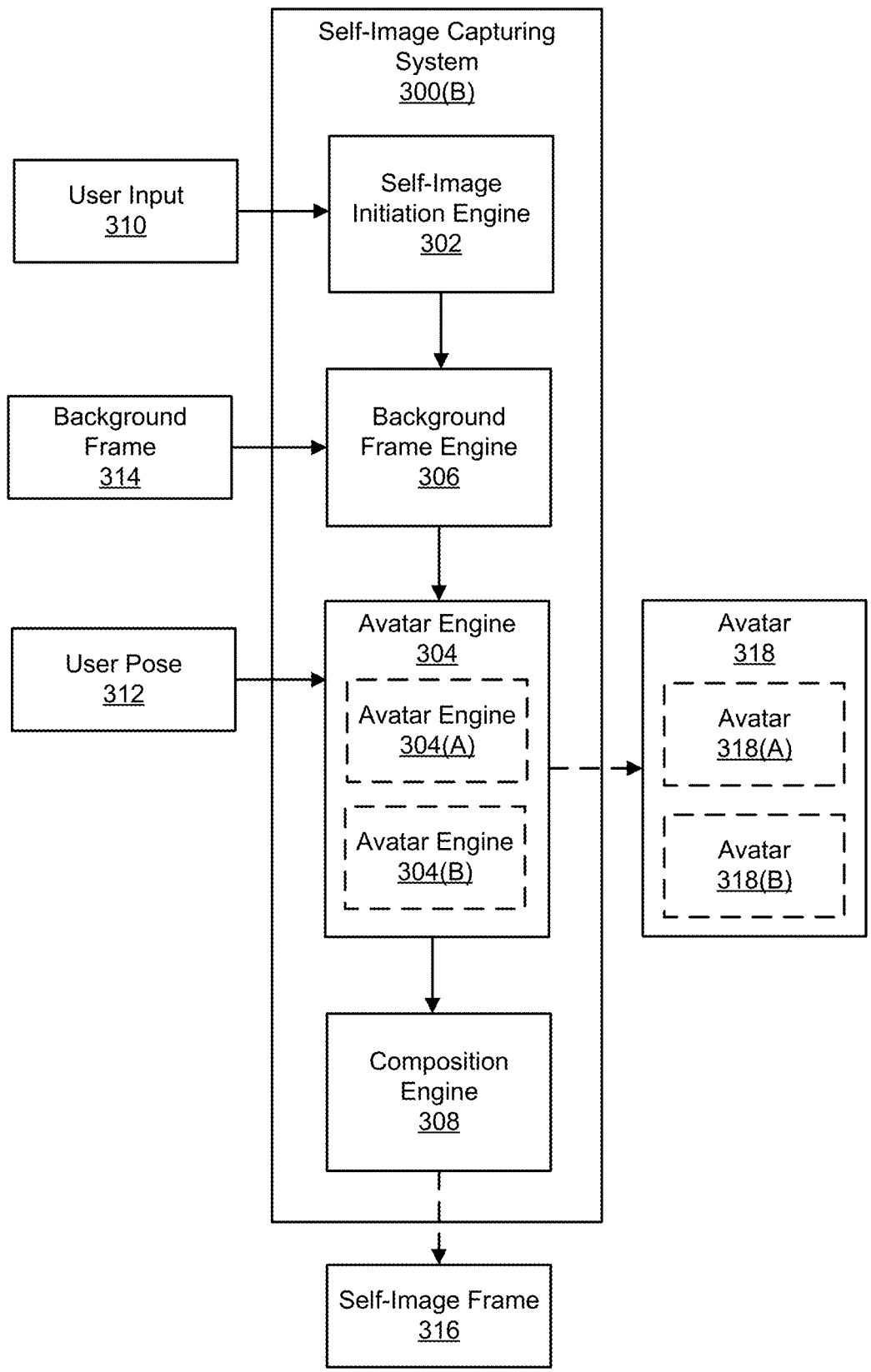

FIG. 3A and FIG. 3B are block diagrams illustrating examples of a self-image capturing system 300(A) and a self-image capturing system 300(B), respectively. In some cases, the self-image capturing systems 300(A) and 300(B) can represent different example implementations or operations of a single system or device (e.g., a single extended reality system or device) and different example implementations of the self-image capturing techniques described herein. For example, the self-image capturing systems 300(A) and 300(B) can correspond to different implementations or operations of the self-image engine 222 of the extended reality system 200. As shown, the self-image capturing systems 300(A) and 300(B) can include one or more of the same components. For example, the self-image capturing systems 300(A) and 300(B) can include one or more engines, including a self-image initiation engine 302, an avatar engine 304, a background frame engine 306, and a composition engine 308. The engines of the self-image capturing systems 300(A) and 300(B) can be configured to generate a self-image frame 316. The self-image frame 316 can include one or more background frames (e.g., a background frame 314) onto which a digital representation (e.g., an avatar 318) of at least one user is overlaid. For example, the self-image frame 316 can correspond to a "selfie" picture or a "selfie" video.

In some cases, the self-image capturing systems 300(A) and 300(B) can each be configured to perform a multi-operation process for self-image capturing. The following description will provide a general explanation of the various operations of the self-image capturing processes performed by the self-image capturing systems 300(A) and 300(B). More detailed explanations of the specific implementations corresponding to the self-image capturing system 300(A) and the self-image capturing systems 300(B) will then be provided with specific references to individual figures.

In some cases, the self-image initiation engine 302 can detect user input (e.g., a user input 310) corresponding to initiation of a self-image capturing process. For example, the self-image initiation engine 302 can detect user input corresponding to activation of a "selfie mode" within an XR device (or other type of device) implementing the self-image capturing system 300(A) and/or 300(B). The user input 310 can include various types of user input, such as a voice command, a touch input, a gesture input, among other types of input. In some cases, the self-image initiation engine 302 can detect the user input 310 while the user is wearing and/or using the XR device within a real-world environment. For example, the self-image initiation engine 302 can monitor one or more user interfaces of the XR device for the user input 310 while the XR device is in use.

Based on detecting the user input 310, the self-image capturing system 300(A) and/or 300(B) can initiate a next operation in the self-image capturing process. In one example, the avatar engine 304 can determine a user pose 312. The user pose 312 can include and/or correspond to physical qualities and/or characteristics of the user. For example, the user pose 312 can include one or more of the user's current expression, emotion, gestures (e.g., hand gestures), limb positions, etc. Further, the user pose 312 can include and/or correspond to the physical location (e.g., 3D location) of the user within the real-world environment. The avatar engine 304 can determine the user pose 312 using various tracking and/or scanning techniques and/or algorithms. For instance, the avatar engine 304 can determine the user pose 312 using one or more eye tracking techniques, SLAM techniques, 6DOF positioning techniques, body tracking techniques, facial expression tracking techniques, computer vision techniques, any combination thereof, or other tracking and/or scanning techniques. In one example, the avatar engine 304 can determine the user pose 312 by applying one or more of such tracking and/or scanning techniques to image data captured by an inward-facing camera the XR device (e.g., an HMD). In some cases, the inward-facing camera of the XR device may be capable of capturing a portion of the user's face and/or body. For instance, the field-of-view (FOV) of the inward-facing camera may correspond to less than the entirety of the user's face and/or body (e.g., due to the placement of the camera and/or the XR device visually blocking the user's face). Thus, in some cases, the avatar engine 304 can determine (e.g., infer and/or estimate) the user pose 312 based on image data corresponding to a portion of the user. For instance, as will be explained in more detail below, the avatar engine 304 can determine the user pose 312 using a machine learning algorithm trained to determine user poses based on image data corresponding to portions of users. Further, in some examples, the avatar engine 304 can determine the user pose 312 using one or more outward-facing cameras of the XR device. For example, the avatar engine 304 can determine the user's facial expression based at least in part on image data captured by an inward-facing camera, and determine limb positions and/or hand gestures of the user based at least in part on image data captured by an outward-facing camera. The avatar engine 304 can determine the user pose 312 using any combination of inward-facing cameras, outward-facing cameras, and/or additional cameras of the XR device.

In some cases, the avatar engine 304 can capture the user pose 312 based on additional user input. For instance, the avatar engine 304 can detect user input directing the avatar engine 304 to capture the current pose of the user. The additional user input can include various types of user input, such as a voice command, a touch input, a gesture input, among other types of input. In an illustrative example, the user can provide the input once satisfied with their current pose and/or location. Further, the user input can include input directing the avatar engine 304 to capture a single frame corresponding to the user pose 312 (e.g., for generation of a single self-image), or input directing the avatar engine 304 to capture a series of frames corresponding to the user pose 312 (e.g., for generation of a self-video).

In some examples, the avatar engine 304 can generate an avatar 318 of the user that reflects the user pose 312. As used herein, the term "avatar" can include any digital representation of all or a portion of a user. In one example, an avatar of a user can include computer-generated image data. Additionally or alternatively, an avatar of a user can include image data captured by an image sensor. Further, an avatar of a user can correspond to an abstract (e.g., cartoon-like) representation of the user, or a photo-realistic (or almost photo-realistic) representation of the user. In some cases, generating the avatar 318 to reflect the user pose 312 can be referred to as "puppeteering" the avatar 318.

In some examples, the avatar engine 304 can generate the avatar 318 using one or more machine learning systems and/or algorithms. For example, the avatar engine 304 can generate the avatar 318 based on a machine learning model trained using a machine learning algorithm on image data associated with various user poses. In this example, the machine learning model can be trained to output an avatar whose pose corresponds to a captured user pose when information indicating the captured user pose is input to the model during inference. In an illustrative example, once the machine learning model is trained, the avatar engine 304 can provide, as input to the model, information indicating a captured pose of the user and one or more images of the user. In some cases, the one or more images of the user may be unrelated to the pose of the user. For example, the avatar engine 304 can capture the one or more images of the user (e.g., full-body images of the user) as part of setting up and/or configuring a self-image capturing system for the user. Based on the captured pose of the user and the one or more images of the user, the machine learning model can output an avatar that resembles the user in the captured pose. For instance, if the captured pose of the user includes a particular hand gesture (e.g., a "peace sign"), the machine learning model can output an avatar that resembles the user making the particular hand gesture (even if the model has no previous image data associated with the user making the particular hand gesture).

The avatar engine 304 can implement various types of machine learning algorithms to generate the avatar 318. In an illustrative example, the avatar engine 304 can implement a deep neural network (NN), such as generative adversarial network (GAN). Illustrative examples of deep neural networks are described below with respect to FIG. 8 and FIG. 9. Additional examples of the machine learning model include, without limitation, a time delay neural network (TDNN), a deep feed forward neural network (DFFNN), a recurrent neural network (RNN), an auto encoder (AE), a variation AE (VAE), a denoising AE (DAE), a sparse AE (SAE), a markov chain (MC), a perceptron, or some combination thereof. The machine learning algorithm may be a supervised learning algorithm, an unsupervised learning algorithm, a semi-supervised learning algorithm, any combination thereof, or other learning techniques.

In some examples, the avatar engine 304 can implement multiple (e.g., two or more) machine learning models configured to generate different versions of the avatar 318. For instance, as shown in FIG. 3A and FIG. 3B, the avatar engine 304 can optionally include an avatar engine 304(A) and an avatar engine 304(B). In some cases, the avatar engine 304(A) can generate or obtain a first version of the avatar (denoted as avatar 318(A)) and a second version of the avatar (denoted as avatar 318(B)). In one example, the avatar 318(A) can correspond to a preview or initial version of the avatar 318. In such an example, the avatar 318(B) can correspond to a final version of the avatar 318. In some cases, the avatar 318(A) (the preview or initial version) can be a lower fidelity version as compared to the avatar 318(B) (the final version). In some examples, the avatar engine 304(A) can generate and/or display the avatar 318(A) before the user pose 312 and/or the background frame 314 are captured (e.g., to facilitate capturing a desired user pose 312 and/or background frame 314). Once the user pose 312 and/or the background frame 314 are captured, the avatar engine 304(B) can generate the avatar 318(B). The composition engine 308 can generate the self-image frame 316 using the avatar 318(B). For instance, the lower fidelity avatar (e.g., avatar 318(A)) is displayed by the XR device or system when the user in in their current pose. The user can then operate the XR device or system to capture a final pose (e.g., used for generating avatar 318(B)), which the composition engine 308 can use for the composition when generating the self-image frame 316. A benefit of presenting to a lower fidelity avatar (e.g., avatar 318(A)) during the pose capture stage or the background image capture stage can allow the composition to be performed with lower processing power before the final composition is performed using the higher fidelity avatar (e.g., avatar 318(B)).

In some cases, the avatar engine 304(A) can implement a first machine learning model that generates the avatar 318(A) (e.g., the preview or initial version of the avatar 318). In some cases, the avatar engine 304(B) can implement a second machine learning model that generates the avatar 318(B) (e.g., the final version of the avatar 318). In some aspects, the first machine learning model implemented by the avatar engine 304(A) may require less processing power than the second machine learning model implemented by the avatar engine 304(B). For instance, the first machine learning model may be a relatively simple (e.g., low-fidelity) model that can be implemented locally (e.g., within the XR system or device). The first machine learning model can also be implemented in real-time (or approximately real-time) in some aspects. The second machine learning model may be relatively complex (e.g., high-fidelity). In some aspects, second machine learning model may be implemented offline (e.g., using a remote server or device configured for generating avatars).

In some cases, the background frame engine 306 can capture one or more background frames (e.g., the background frame 314). The background frame 314 can include and/or correspond to any frame that is to be the background of the self-image (or self-video). In one example, the background frame engine 306 can capture the background frame 314 based on additional user input. For example, the background frame engine 306 can detect user input directing the background frame engine 306 to capture one or more frames of the real-world environment using an outward-facing camera of the XR system or device. The additional user input can include various types of user input, such as a voice command, a touch input, a gesture input, among other types of input. In an illustrative example, the user can provide the input once satisfied with the current view of the real-world environment (which can be displayed on and/or through a display of the XR device). Further, the user input can include input directing the background frame engine 306 to capture a single frame of the real-world environment (e.g., for generation of a single self-image), or input directing the background frame engine 306 to capture a series of frames of the real-world environment (e.g., for generation of a self-video).

The composition engine 308 can generate the self-image frame 316 (or a series of self-image frames) based on the avatar 318 (e.g., the avatar 318(B)) and the background frame 314. For instance, the composition engine 308 can overlay the avatar 318 on the background frame 314. As mentioned above, the avatar engine 304 can determine the 3D location of the user corresponding to the user pose 312. Thus, the composition engine 308 can overlay the avatar 318 within the background frame 314 in a corresponding location. For instance, the composition engine 308 can render the avatar 318 within the background frame 314 such that the avatar 318 appears to be located at the same 3D location as the user when the avatar engine 304 captured the user pose 312. In this way, the resulting self-image frame 316 can appear to be an image of the user taken from the perspective of facing the user (e.g., the perspective of a front-facing camera used to capture conventional "selfies").

In some examples, the composition engine 308 can overlay the avatar 318 onto the background frame 314 using one or more machine learning systems and/or algorithms. For example, the composition engine 308 can overlay the avatar 318 onto the background frame 314 based on a machine learning model trained using a machine learning algorithm on image data associated with various avatars and/or background frames. In this example, the machine learning model can be trained to incorporate avatars into background frames such that visual characteristics (e.g., lighting, color, etc.) of the avatars are consistent and/or coherent with visual characteristics of the background frames. For instance, once the machine learning model is trained, the composition engine 308 can provide, as input to the model, one or more background frames and information associated with an avatar (e.g., an at least partially rendered avatar and/or a machine learning model trained to generate avatars). Based on the information associated with the avatar, the machine learning model can superimpose the avatar onto the one or more background frames in a natural and/or photo-realistic manner. In an illustrative example, the model can determine that the one or more background frames include a shadow in the location at which the avatar is to be overlaid. In this example, the model can render the avatar to include a corresponding shadow.

The composition engine 308 can implement various types of machine learning algorithms to generate the self-image frame 316, including any of the machine learning algorithms that can be implemented by the avatar engine 304 to generate the avatar 318 (described above). In some cases, the machine learning model implemented by the composition engine 308 may be different than the machine learning model implemented by the avatar engine 304. For instance, the output of the machine learning model trained to generate the avatar 318 can be input to the machine learning model trained to generate the self-image frame 316.

Figure 4A:
FIG. 4A, FIG. 4B, FIG. 4C, FIG. 4D, FIG. 4E, and FIG. 4F are illustrations of example self-images generated by systems for self-image capturing in extended reality environments, in accordance with some examples.
Figure 4B:

In an illustrative example, the self-image capturing system 300(A) shown in FIG. 3A can perform the operation of generating the avatar 318 prior to the operation of capturing the background frame 314. FIG. 4A, FIG. 4B, and FIG. 4B illustrative an example of such a self-image capturing process. In this example, the self-image initiation engine 302 can detect the user input 310 corresponding to initiation of the self-image capturing mode of the XR device. In response to the user input 310, the self-image capturing system 300(A) can initiate a pose-capturing mode in which the avatar engine 304 can capture the user pose 312. In an illustrative example, the avatar engine 304 can output an instruction (e.g., within a display of the XR device) directing the user to assume a desired pose for a self-image. However, in some examples, the avatar engine 304 may not output an instruction (e.g., if the user is familiar with the self-image capturing process). In some cases, the desired pose can include a desired 3D location within the real-world environment (e.g., to facilitate rendering the avatar 318 in a corresponding location within the background frame 314). While in the pose-capturing mode, the avatar engine 304 can detect user input directing the avatar engine 304 to capture the user pose 312.

FIG. 4A illustrates an example frame 402 corresponding to at least a portion of the user pose 312. In this example, the user pose 312 includes a hand gesture (e.g., a "peace sign"). The avatar engine 304 can detect the hand gesture based at least in part on image data captured by one or more outward-facing cameras of the XR device. Although not shown, the user pose 312 can include additional information about the physical appearance of the user. For example, the avatar engine 304 can determine information about the position of the user's body and/or other limbs. In another example, the avatar engine 304 can determine information about the user's expression (e.g., based on image data captured by one or more inward-facing cameras of the XR device). Based on the user pose 312, the avatar engine 304 can generate (e.g., puppeteer) the avatar 318. For example, the avatar engine 304 can provide the user pose 312 (and one or more images of the user) to a machine learning model trained to generate avatars that reflect user poses. In an illustrative example, the avatar engine 304(A) can generate the avatar 318(A) (e.g., a preview version of the avatar 318) based on the user pose 312.

Once the avatar engine 304 generates the avatar 318 (e.g., the avatar 318(A), the self-image capturing system 300(A) can initiate a background-capturing mode in which the background frame engine 306 can capture the background frame 314. In an illustrative example, the background frame engine 306 can output an instruction (e.g., within the display of the XR device) directing the user to select a 3D location within the real-world environment for the self-image (or self-video). However, in some examples, the background frame engine 306 may not output an instruction (e.g., if the user is familiar with the self-image capturing process). In one example, the user can move within the real-world environment until the current FOV of the display of the XR device corresponds to a desired background frame for the self-image frame 316. While in the background-capturing mode, the background frame engine 306 can detect user input directing the background frame engine 306 to capture the desired background frame. Once the background frame engine 306 captures the background frame 314, the composition engine 308 can generate the self-image frame 316 by overlaying the avatar 318 on the background frame 314. For example, the composition engine 308 can render the avatar 318 within the background frame 314 in a location corresponding to the 3D location of the user pose 312. In an illustrative example, the avatar engine 304(B) can generate and/or obtain the avatar 318(B) (e.g., the final version of the avatar 318) based on the background frame 314 being captured. In this example, the composition engine 308 can generate the self-image frame 316 by rendering the avatar 318(B) within the background frame 314.

In some cases, the avatar engine 304 can render the avatar 318 within the display of the XR device while the self-image capturing system 300(A) is operating in the background-capturing mode (e.g., while user is moving around the real-world environment to select the background frame 314). For example, the avatar engine 304 can render the avatar 318 (e.g., the avatar 318(A)) in a location corresponding to the 3D location of the user when the user pose 312 was captured. As the FOV of the display of the XR device changes (e.g., based on movement of the user), the avatar engine 304 can adjust the location of the rendered avatar 318 (e.g., the avatar 318(A)) within the display to account for the movement. Thus, in the self-image capturing process implemented by the self-image capturing system 300(A), the avatar 318 can be "world-locked." In some cases, a world-locked avatar can enable the user to select a background frame that is suitable for the real-world location corresponding to the avatar 318. For example, if the XR device moves such that the 3D location corresponding to the avatar 318 is no longer within the FOV of the XR device, the avatar engine 304 can remove the avatar 318 from the display. In this way, the user can ensure that the avatar 318 is properly positioned within the FOV corresponding to the background frame 314.

Figure 4C:

FIG. 4B illustrates an example frame 404 corresponding to an FOV of the XR device while the self-image capturing system 300(A) is operating in the background-capturing mode. FIG. 4C illustrates an example frame 406 corresponding to the self-image frame 316 generated by the composition engine 308 once the background frame engine 306 captures the background frame 314. In these examples, the frame 404 includes the avatar 318(A) and the frame 406 includes the avatar 318(B). For instance, the avatar engine 304 can render the avatar 318(A) while the self-image capturing system 300(A) is in the background-capturing mode and the composition engine 308 can replace the avatar 318(A) with the avatar 318(B) when generating the self-image frame 316. As mentioned above, the avatar 318(A) can be a low-fidelity version of the avatar 318, and the avatar 318(B) can be a high-fidelity version of the avatar 318. For example, the avatar engine 304 can generate the avatars 318(A) and 318(B) using different machine learning models implemented by the avatar engines 304(A) and 304(B). In one example, the avatar engine 304(A) can generate the avatar 318(A) using a low-fidelity machine learning model that involves and/or requires a lower amount of processing power and/or time than a high-fidelity machine learning model used by the avatar engine 304(B) to generate the avatar 318(B). Using the low-fidelity machine learning model to generate the avatar 318(A) can enable the avatar engine 304(A) to update the location of the avatar 318(A) within the display of the XR device in real-time (or almost real-time) as the FOV of the XR device changes during the background-capturing mode. Further, using the high-fidelity machine learning model to generate the avatar 318(B) can produce a higher-quality (e.g., more realistic) avatar for the finalized self-image. For instance, the avatar 318(A) in FIG. 4B is cartoon-like, whereas the avatar 318(B) in FIG. 4C is photo-realistic. In one example, the avatar engine 304(A) can implement the low-fidelity machine learning model on the XR device (e.g., locally), while the avatar engine 304(B) can direct a remote server configured to generate avatars to implement the high-fidelity machine learning model. The avatar engine 304 can generate any type or number of avatars (including a single avatar using a single machine learning model).

Figure 4D:
Figure 4E:
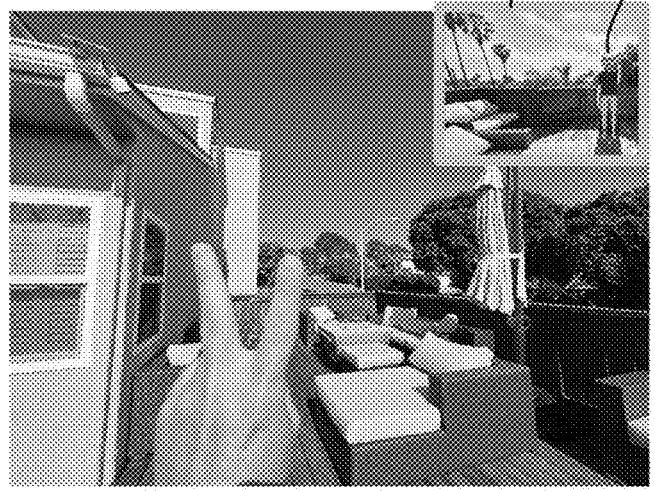
Figure 4F:

Referring to FIG. 3B, the self-image capturing system 300(B) can perform the operation of capturing the background frame 314 prior to the operation of generating the avatar 318. FIG. 4D, FIG. 4E, and FIG. 4F illustrative an example of such a self-image capturing process. In this example, the self-image initiation engine 302 can detect the user input 310 corresponding to initiation of the self-image capturing mode of the XR device. In response to the user input 310, the self-image capturing system 300(B) can initiate a background-capturing mode in which the background frame engine 306 can capture the background frame 314. In this background-capturing mode, the background frame engine 306 can optionally output an instruction directing the user to select a 3D location within the real-world environment for the self-image (or self-video). In one example, the user can move within the real-world environment until the current FOV of the display of the XR device corresponds to a desired background frame for the self-image frame 316. While in the background-capturing mode, the background frame engine 306 can detect user input directing the background frame engine 306 to capture the desired background frame. FIG. 4D illustrates an example frame 408 corresponding to a captured background frame. While the background-capturing mode of the self-image capturing system 300(B) may be similar to the background-capturing mode of the self-image capturing system 300(A), this background-capturing mode may differ in that the avatar 318 (e.g., the avatar 318(A)) is not displayed (e.g., puppeteered) within the display of the XR device while the user selects a location for the self-image.

Once the background frame engine 306 captures the background frame 314, the self-image capturing system 300(B) can initiate a pose-capturing mode in which the avatar engine 304 can capture the user pose 312. In some cases, the avatar engine 304 can optionally output an instruction directing the user to assume a desired pose for a self-image. In some examples, the desired pose can include a desired 3D location within the real-world environment (e.g., to facilitate rendering the avatar 318 in a corresponding location within the background frame 314). While in the pose-capturing mode, the avatar engine 304 can detect user input directing the avatar engine 304 to capture the user pose 312. Based on the user pose 312, the avatar engine 304 can generate (e.g., puppeteer) the avatar 318. For example, the avatar engine 304 can provide the user pose 312 (and one or more images of the user) to a machine learning model trained to generate avatars that reflect user poses. In an illustrative example, the avatar engine 304(B) can generate the avatar 318(B) based on the user pose 312. Once the avatar engine 304 generates the avatar 318 (e.g., the avatar 318(B)), the composition engine 308 can generate the self-image frame 316 by overlaying the avatar 318 on the background frame 314. For example, the composition engine 308 can render the avatar 318 within the background frame 314 in a location corresponding to the 3D location of the user pose 312.

In some cases, the avatar engine 304(A) can render the avatar 318(A) within the display of the XR device while the self-image capturing system 300(B) is in the pose-capturing mode (e.g., while user is moving around the real-world environment prior to the user pose 312 being captured). For example, the avatar engine 304 can dynamically update (e.g., in real-time or approximately real-time) the avatar 318(A) based on changes in the pose of the user. The changes in the pose of the user can include changes in the 3D location of the user within the real-world environment and/or changes in the physical appearance of the user (e.g., the user's expression, hand-gestures, limb positions, etc.). The avatar engine 304(A) can display the avatar 318(A) within a preview window that displays the background frame 314. For example, the avatar engine 304(A) can display the preview window within the display of the XR device and update the avatar 318(A) as the user moves around the real-world environment. In some cases, this version of the avatar 318(A) can be "head-locked" (e.g., in contrast to the "world-locked" version of the avatar 318(A) generated by the self-image capturing system 300(A)). In one example, a head-locked avatar can facilitate precise self-image composition by enabling the user to select a user pose that is suitable for the previously selected background frame 314.

FIG. 4E illustrates an example frame 410 that includes a preview window 414. The preview window 414 can display the (static) background frame 314 and the dynamically updated avatar 318(A). For example, as the pose of the user changes (e.g., due to movement of the user within the real-world environment), the avatar engine 304(A) can update the avatar 318(A) within the preview window 414 to account for the changes. While displaying the avatar 318(A), the avatar engine 304(B) can detect user input directing the avatar engine 304(B) to capture the current user pose (e.g., corresponding to the user pose 312). Based on receiving such user input, the avatar engine 304(B) can generate (e.g., puppeteer) the avatar 318(B) based on the user pose 312. FIG. 4F illustrates an example frame 412 corresponding to the self-image frame 316 generated by the composition engine 308 once the avatar engine 304(B) generates the avatar 318(B) based on the user pose 312. As mentioned above, the avatar 318(A) can correspond to a low-fidelity version of the avatar 318, and the avatar 318(B) can correspond to a high-fidelity version of the avatar 318. For instance, the avatar engine 304(A) can generate the avatar 318(A) using a local and/or low-fidelity machine learning algorithm, and the avatar engine 304(B) can generate and/or obtain the avatar 318(B) using a remote and/or high-fidelity machine learning algorithm. The self-image capturing system 300(B) can generate any type or number of avatars using any suitable machine learning algorithm(s).

As explained above, the self-image capturing systems 300(A) and 300(B) can implement various serialized processes for self-image capturing in XR environments. These self-image capturing systems can enable HMDs and other devices without mechanisms designed for self-image capture (such as the forward-facing cameras of mobile phones) to generate natural and realistic self-images. Further, by capturing the user's pose and the background frame at different points in time, the disclosed self-image capturing systems can enable users to precisely customize and/or optimize the composition of a self-image.

Figure 5A:
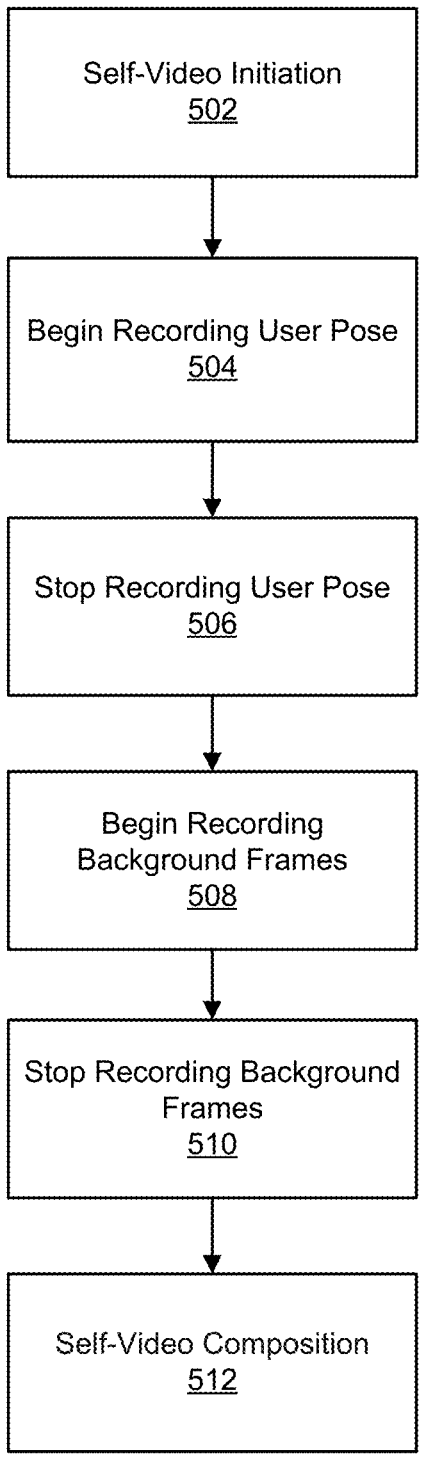
FIG. 5A and FIG. 5B are flow diagrams illustrating examples of processes for self-video capturing in extended reality environments.

As mentioned above, in some cases, the disclosed self-image capturing techniques and systems can be used to generate self-videos. Both the self-image capturing system 300(A) and the self-image capturing system 300(B) can be used to generate self-videos. FIG. 5A is a flowchart of an example process 500(A) for self-video capturing that can be performed by the self-image capturing system 300(A). At operation 502, the process 500(A) can include self-video initiation. For example, the self-image capturing system 300(A) can detect user input corresponding to initiation of a self-video mode. At operation 504, the process 500(A) can include beginning to record the user's pose. For example, the self-image capturing system 300(A) can capture one or more frames using an inward-facing camera and/or an outward-facing camera of the XR device. The self-image capturing system 300(A) can generate (e.g., puppeteer) a plurality of avatars (e.g., a series of avatars) corresponding to the poses of the user indicated by all or a portion of the captured frames. At operation 506, the self-image capturing system 300(A) can stop recording the user's pose. The self-image capturing system 300(A) can record any number of frames associated with the user's pose between operation 504 and operation 506. In one example, the self-image capturing system 300(A) can record a predetermined number of frames (e.g., 10 frames, 50 frames, etc.) and/or record frames for a predetermined amount of time (e.g., 2 seconds, 5 seconds, etc.) In another example, the self-image capturing system 300(A) can record frames until detecting user input directing the self-image capturing system 300(A) to stop recording.

At operation 508, the process 500(A) can include beginning to record one or more background frames (e.g., using a forward-facing camera of the XR device). At operation 510, the self-image capturing system 300(A) can stop recording background frames. The self-image capturing system 300(A) can record any number of background frames between operation 508 and operation 510. In one example, the self-image capturing system 300(A) can record a number of frames corresponding to the number of recorded frames associated with the user's pose (e.g., the number of frames recorded at operation 504). For example, the recording process for recording background frames can automatically terminate (e.g., time-out) after an amount of time corresponding to recording frames associated with the user's pose. In another example, the self-image capturing system 300(A) can record a single background frame. In this example, the single background frame can correspond to a static background for the self-video. At operation 512, the process 500(A) can include self-video composition. For example, the self-image capturing system 300(A) can overlay the plurality of avatars on the one or more background frames.

Figure 5B:
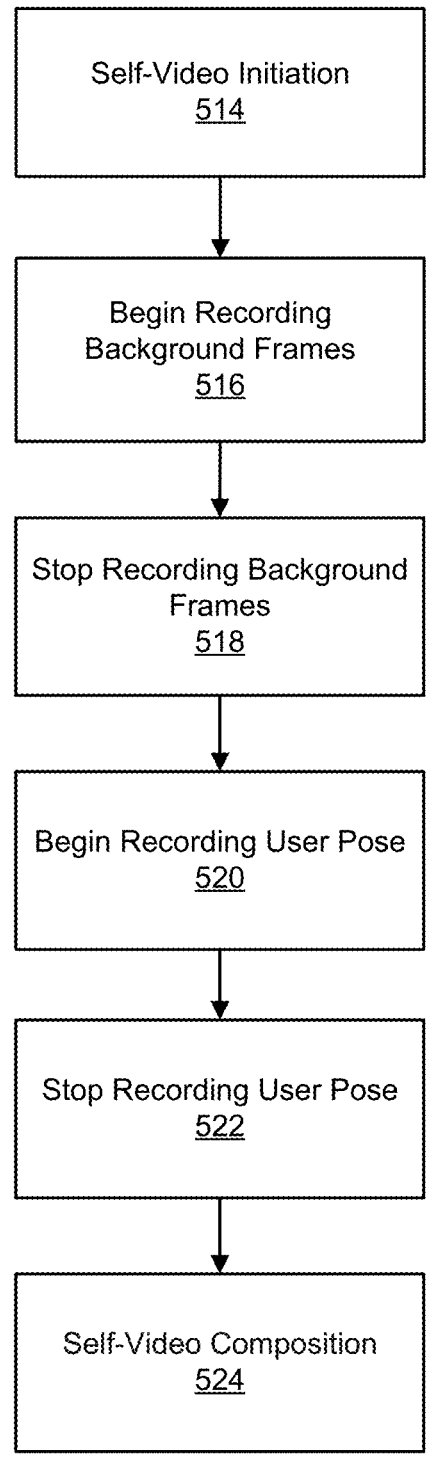

FIG. 5B is a flowchart of an example process 500(B) for self-video capturing that can be performed by the self-image capturing system 300(B). At operation 514, the process 500(B) can include self-video initiation. For example, the self-image capturing system 300(B) can detect user input corresponding to initiation of a self-video mode. At operation 516, the process 500(B) can include beginning to record one or more background frames (e.g., using a forward-facing camera of the XR device). At operation 518, the self-image capturing system 300(B) can stop recording background frames. The self-image capturing system 300(B) can record any number of background frames between operation 516 and operation 518. In one example, the self-image capturing system 300(B) can record a predetermined number of background frames and/or record background frames for a predetermined amount of time. In another example, the self-image capturing system 300(B) can record background frames until detecting user input directing the self-image capturing system 300(A) to stop recording.

At operation 520, the process 500(B) can include beginning to record the user's pose. For example, the self-image capturing system 300(B) can capture one or more frames using an inward-facing camera and/or an outward-facing camera of the XR device. The self-image capturing system 300(B) can generate (e.g., puppeteer) a plurality of avatars corresponding to the poses of the user indicated by all or a portion of the captured frames. At operation 522, the self-image capturing system 300(B) can stop recording frames associated with the pose of the user. The self-image capturing system 300(B) can record any number of frames associated with the pose of the user. In one example, the self-image capturing system 300(B) can record a number of frames corresponding to the number of recorded background frames. For example, the recording process for recording the pose of the user can automatically terminate (e.g., time-out) after an amount of time corresponding to recording background frames. At operation 524, the process 500(B) can include self-video composition. For example, the self-image capturing system 300(B) can overlay the plurality of avatars on the one or more background frames.

Figure 6A:
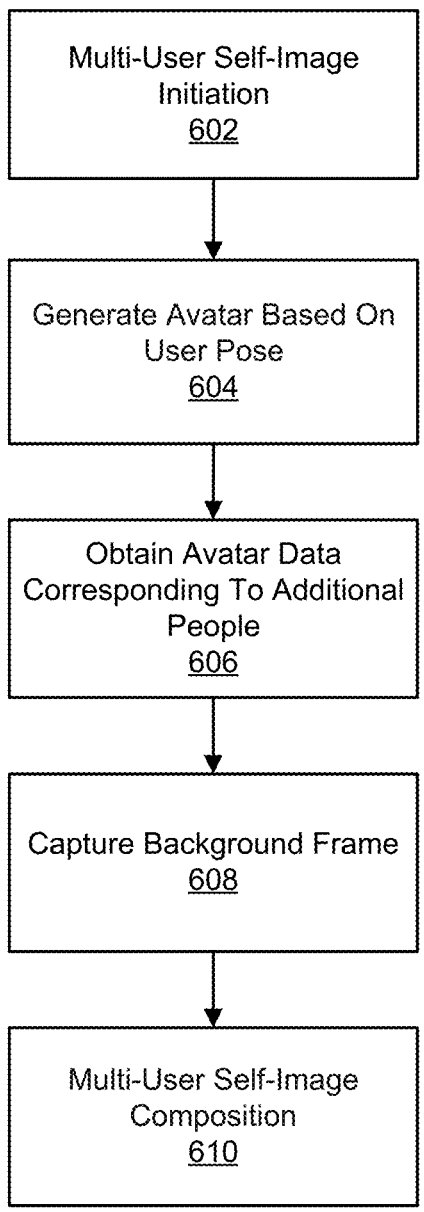
FIG. 6A and FIG. 6B are flow diagrams illustrating examples of processes for multi-user self-image capturing in extended reality environments.

In some cases, the disclosed techniques and systems for self-image capturing in XR environments can be used to generate self-images or self-videos including multiple people. Both the self-image capturing system 300(A) and the self-image capturing system 300(B) can be used to generate self-images or self-videos including multiple people. FIG. 6A is a flowchart of an example process 600(A) for multi-user self-image capturing that can be performed by the self-image capturing system 300(A). At operation 602, the process 600(A) can include multi-user self-image initiation. For example, the self-image capturing system 300(A) can detect user input corresponding to initiation of a multi-user self-image capturing mode. At operation 604, the process 600(A) can include generating an avatar based on a captured user pose. For example, the self-image capturing system 300(A) can puppeteer an avatar corresponding to the current pose of the user wearing the XR device. In some cases, the self-image capturing system 300(A) can capture the pose of the user while the user is posed with one or more other people to be included within the multi-user self-image.

At operation 606, the process 600(A) can include obtaining avatar data corresponding to additional people. For example, the self-image capturing system 300(A) (implemented on the XR device worn the user) can send requests to one or more nearby XR devices to receive data associated with avatars of any other people to be included within the multi-user self-image. In one example, the self-image capturing system 300(A) can broadcast requests to any XR devices within a broadcast range of the self-image capturing system 300(A). In another example, the self-image capturing system 300(A) can send specific requests to XR devices known to be associated with one or more people to be included within the multi-user self-image. For instance, the self-image capturing system 300(A) can send requests to particular XR devices based on user input and/or send requests to XR devices with which the self-image capturing system 300(A) has previously communicated and/or connected.

In one example, the avatar data requested by the self-image capturing system 300(A) can include avatars corresponding to the one or more other people to be included within the multi-user self-image. For instance, the self-image capturing system 300(A) can prompt self-image capturing systems implemented on XR devices associated with the one or more people to generate avatars corresponding to captured poses of the one or more other people. In another example, the avatar data can include data enabling the self-image capturing system 300(A) to generate avatars corresponding to the one or more other people. For instance, the avatar data can include information about captured poses of the one or more other people. The avatar data can also include machine learning models (e.g., avatar conditioning networks) trained to generate avatars of the one or more other people. In some cases, the models can be trained using one or more images (e.g., full-body images) of the one or more other people. Notably, in some cases, a person (or multiple people) to be included in the multi-user self-image may not be wearing and/or associated with an XR device configured to generate avatars. In these cases, the self-image capturing system 300(A) may not obtain data associated with an avatar corresponding to the person.

At operation 608, the process 600(A) can include capturing a background frame. For example, the self-image capturing system 300(A) can detect user input directing the self-image capturing system 300(A) to capture a background frame corresponding to the current FOV of the XR device. In one example, the background frame can include image data corresponding to the one or more other people to be included in the multi-user self-image. For instance, the user can move within the real-world environment while the one or more other people remain stationary. Once the user determines the current FOV of the XR device is suitable for the background frame (e.g., based on the current FOV including the one or more other people), the user can provide input directing the self-image capturing system 300(A) to capture the background frame.

At operation 610, the process 600(A) can include multi-user self-image composition. In examples where the self-image capturing system 300(A) receives avatars (e.g., previously generated avatars) of the one or more people, the self-image capturing system 300(A) can overlay the avatars (and the avatar of the user) on the background frame. For instance, the self-image capturing system 300(A) can replace image data corresponding to the one or more other people with appropriate avatars. In examples where the self-image capturing system 300(A) receives machine learning models trained to generate avatars of the one or more other people, the self-image capturing system 300(A) can use the models to render avatars corresponding to one or more other people within the background frame.

Figure 6B:
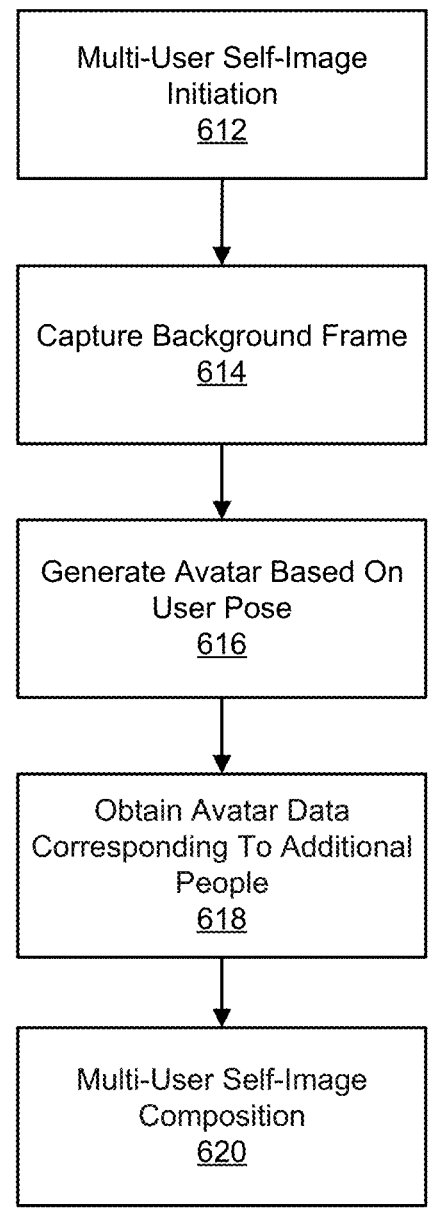
Figure 6C:
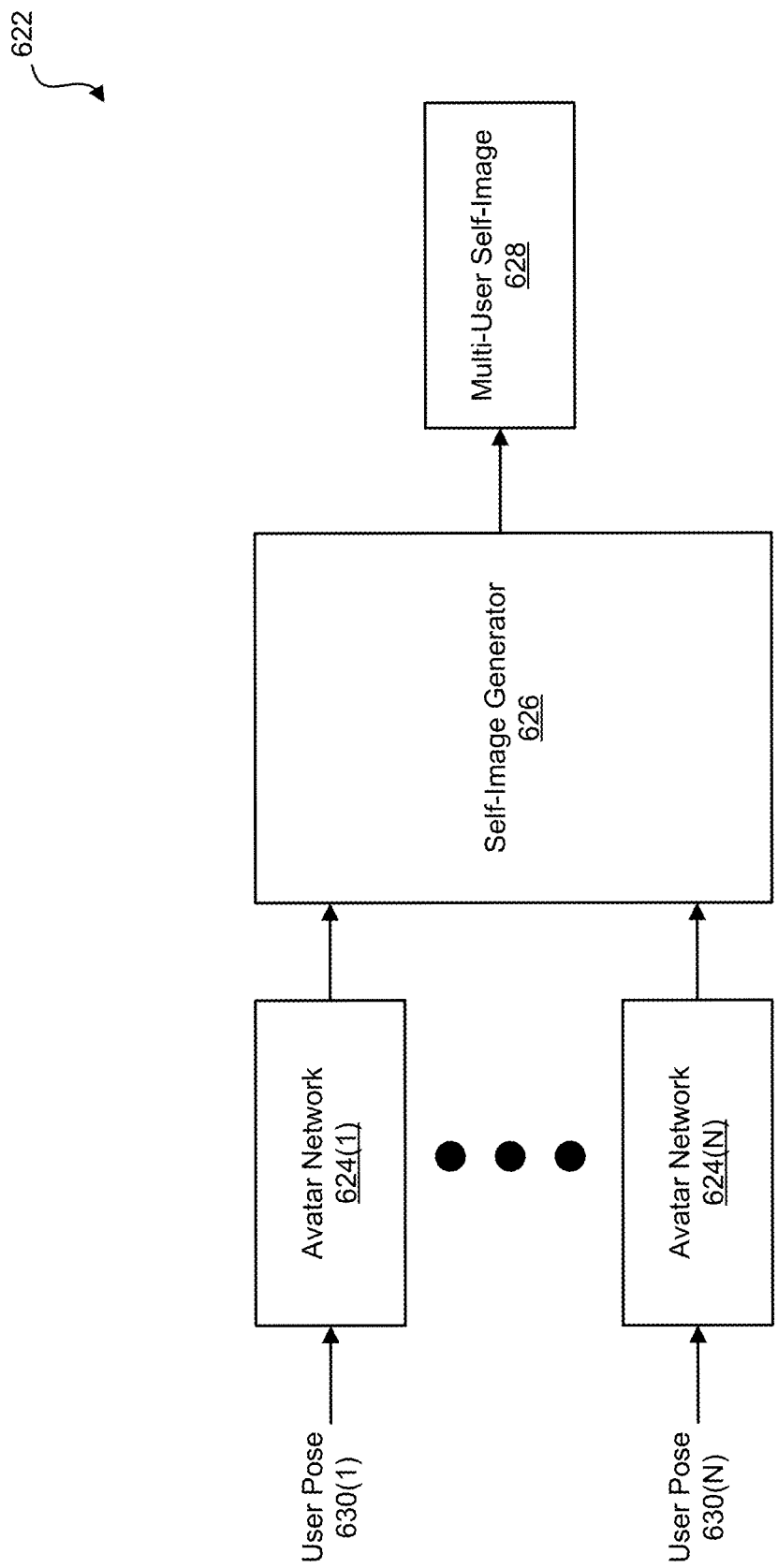
FIG. 6C is a block diagram illustrating an example of a system for multi-user self-image capturing in extended reality environments, in accordance with some examples.

For example, FIG. 6C is a block diagram of a multi-user self-image capturing system 622. The multi-user self-image capturing system 622 can receive user poses 630(1)-(N), which correspond to captured user poses of the one or more other people. The multi-user self-image capturing system 622 can also receive avatar networks 624(1)-624(N), which correspond to machine learning models (e.g., model files of machine learning models) trained to generate avatars of the one or more other people. Based on user poses 630(1)-(N), the multi-user self-image capturing system 622 can implement the avatar networks 624(1)-624(N) to generate avatars corresponding to the one or more other people. The generated avatars can be input to a self-image generator 626, which corresponds to a machine learning model trained to render one or more avatars within background frames. The self-image generator 626 can generate a multi-user self-image 628 that includes avatars corresponding to the user and the one or more other people. In some cases, the self-image generator 626 can ensure that the avatars are globally consistent and/or cohesive within the multi-user self-image 628. For example, the self-image generator 626 can normalize the lighting, color, and/or other visual characteristics of the avatars. In some cases, the self-image generator 628 can also remove any occlusions visible in the background frames that may obscure portions of the avatars. Further, the self-image generator 626 can ensure that XR devices worn by the one or more people are not depicted within the multi-user self-image 628. In examples where a person (or multiple people) to be included within the multi-user self-image 628 is not associated with an XR device and/or an avatar, the multi-user self-image capturing system 622 can leave image data corresponding to the person within the background frame unchanged.

FIG. 6B is a flowchart of an example process 600(B) for multi-user self-image capturing that can be performed by the self-image capturing system 300(B). At operation 612, the process 600(B) can include multi-user self-image initiation. For example, the self-image capturing system 300(B) can detect user input corresponding to initiation of a multi-user self-image capturing mode. At operation 614, the process 600(B) can include capturing a background frame. For example, the self-image capturing system 300(B) can detect user input directing the self-image capturing system 300(B) to capture a background frame corresponding to the current FOV of the XR device. In some cases, this background frame may not include image data corresponding to one or more people to be included within the multi-user self-image. For example, the self-image capturing system 300(B) can capture the background frame before the user and the one or more other people pose themselves as desired for the multi-user self-image. At operation 616, the process 600(B) can include generating an avatar based on a captured user pose. For example, the self-image capturing system 300(B) can detect user input directing the self-image capturing system 300(B) to capture the pose of the user (e.g., once the user and the one or more other people have posed themselves). The self-image capturing system 300(B) can puppeteer an avatar corresponding to the current pose of the user wearing the XR device.

At operation 618, the process 600(B) can include obtaining avatar data corresponding to the one or more other people. For example, the self-image capturing system 300 (B) (implemented on the XR device of the user) can send requests to one or more nearby XR devices to receive avatars of the one or more other people. In another example, the self-image capturing system 300(B) can send requests to receive data enabling the self-image capturing system 300 (B) to generate avatars of the one or more other people. For instance, the self-image capturing system 300(B) can send requests to receive machine learning models trained to generate avatars of the one or more other people (such as the avatar networks 624(1)-(N) shown in FIG. 6C). In some cases, the self-image capturing system 300(B) can send requests to nearby XR devices in any of the same manners as can be performed by the self-image capturing system 300(A) at operation 606 of the process 600(A). At operation 620, the process 600(B) can perform multi-user self-image composition. In examples where the self-image capturing system 300(B) receives avatars (e.g., previously generated avatars) of the one or more people, the self-image capturing system 300(B) can overlay the avatars (and the avatar of the user) on the background frame. In examples where the self-image capturing system 300(B) receives machine learning models trained to generate avatars of the one or more other people, the self-image capturing system 300(B) can use the models to render avatars corresponding to one or more other people within the background frame. For example, the self-image capturing system 300(B) can input avatars generated by the models to the self-image generator 626 shown in FIG. 6C.

FIG. 7 is a flow diagram illustrating an example process 700 for self-image capturing in extended reality environments. For the sake of clarity, the process 700 is described with references to the self-image capturing systems 300(A) and 300(B) shown in FIG. 3A and FIG. 3B. The steps or operations outlined herein are examples and can be implemented in any combination thereof, including combinations that exclude, add, or modify certain steps or operations.

At operation 702, the process 700 includes capturing a pose of a user of an extended reality system, the pose of the user including a location of the user within a real-world environment associated with the extended reality system. In some examples, the avatar engine 304 can capture the pose of the user based at least in part on image data captured by an inward-facing camera system of the extended reality system. Further, the avatar engine 304 can capture the pose of the user based at least in part on determining an expression of the user and/or determining a gesture of the user. In one example, the avatar engine 304 can determine the location of the user within the real-world environment based at least in part on generating a three-dimensional map of the real-world environment.

At operation 704, the process 700 includes generating a digital representation of the user, the digital representation of the user reflecting the pose of the user. In some examples, the process 700 can generate a first digital representation of the user and a second digital representation of the user. In some cases, the second digital representation of the user can be a higher-fidelity digital representation of the user than the first digital representation of the user. For instance, the process 700 can include generating or obtaining the first digital representation having a first fidelity and generating or obtaining the second digital representation having a second fidelity (with the second fidelity being higher than the first fidelity). In some aspects, the first digital representation of the user can correspond to a preview digital representation of the user that can be displayed to the user to facilitate capturing a desired background frame and/or pose of the user. In some aspects, the second digital representation of the user can correspond to a final digital representation of the user.

In some examples, the avatar engine 304 can generate the digital representation of the user using a machine learning algorithm. For instance, in some cases, the avatar engine 304 can generate the first digital representation of the user based on a first machine learning algorithm. The avatar engine 304 can obtain the second digital representation of the user based on a second machine learning algorithm. In some cases, the avatar engine 304 can generate the first digital representation of the user based on implementing the first machine learning algorithm on the extended reality system. In some cases, the avatar engine 304 can obtain the second digital representation of the user by causing a server configured to generate digital representations of users to generate the second digital representation of the user using the second machine learning algorithm.

At operation 706, the process 700 includes capturing one or more frames of the real-world environment. In some examples, the background frame engine 306 can capture the one or more frames of the real-world environment using an outward-facing camera system of the extended reality system. In one example, the operation 706 can be performed after the operation 702 and/or the operation 704. For instance, the avatar engine 304 can generate the digital representation of the user before the background frame engine 306 captures the one or more frames of the real-world environment. In this example, the avatar engine 304 can display, within a display of the extended reality system through which the real-world environment is visible, the digital representation of the user in a display location corresponding to the location of the user within the real-world environment. In some examples, the avatar engine 304 can display the digital representation of the user using the captured pose of the user (captured at operation 702). While the digital representation of the user is displayed within the display of the extended reality system, the background frame engine 306 can detect user input corresponding to an instruction to capture the one or more frames of the real-world environment. The background frame engine 306 can then capture the one or more frames of the real-world environment based on the user input. In one example, the avatar engine 304 can display the first (e.g., preview) digital representation of the user in the display of the extended reality system before the background frame engine 306 captures the one or more frames of the real-world environment. The avatar engine 304 can generate the second (e.g., final) digital representation of the user based on the one or more frames of the real-world environment being captured and/or based on the pose of the user in the one or more frames.

In another example, the operation 706 can be performed before the operation 702 and/or the operation 704. For instance, the background frame engine 306 can capture the one or more frames of the real-world environment before the avatar engine 304 captures the pose of the user. In this example, the avatar engine 304 can display, within a display of the extended reality system on which the one or more frames of the real-world environment are displayed, the digital representation of the user in a display location corresponding to the location of the user within the real-world environment. In some examples, the avatar engine 304 can display the digital representation of the user using a current pose of the user. The avatar engine 304 can update the display location of the digital representation of the user based on detecting a change in the location of the user within the real-world environment. While the digital representation of the user is displayed within the display of the extended reality system, the avatar engine 304 can detect user input corresponding to an instruction to capture the pose of the user. The avatar engine 304 can then capture the pose of the user based on the user input. In one example, the avatar engine 304 can display the first (e.g., preview) digital representation of the user in the display of the extended reality system before capturing the pose of the user. The avatar engine 304 can generate the second (e.g., final) digital representation of the user based on the one or more frames of the real-world environment being captured and/or based on the pose of the user being captured.

At operation 708, the process 700 includes overlaying the digital representation of the user onto the one or more frames of the real-world environment. In some examples, the composition engine 308 can overlay the digital representation of the user onto the one or more frames of the real-world environment in a frame location corresponding to the location of the user within the real-world environment. In one example, the composition engine 308 can overlay the digital representation of the user onto the one or more frames of the real-world environment using a machine learning algorithm. The machine learning algorithm can be different than the machine learning algorithm used by the avatar engine 304 to generate the digital representation of the user.

In some examples, the process 700 can include capturing a pose of a person within the real-world environment and generating a digital representation of the person. The digital representation of the person can reflect the pose of the person. The process 700 can also include overlaying the digital representation of the user and the digital representation of the person onto the one or more frames of the real-world environment. In one example, the avatar engine 304 can generate the digital representation of the person based at least in part on information associated with the digital representation of the person received from an extended reality system of the person. The information associated with the digital representation of the person can include a machine learning model trained to generate digital representations of the person.

In further examples, the process 700 can include capturing a plurality of poses of the user associated with a plurality of frames and generating a plurality of digital representations of the user corresponding to the plurality of frames. The process 700 can also include overlaying the plurality of digital representations of the user onto the one or more frames of the real-world environment, the one or more frames of the real-world environment including a plurality of frames of the real-world environment.

In some examples, the processes 500(A), 500(B), 600(A), 600(B), 700 and/or other processes described herein may be performed by one or more computing devices or apparatuses. In some examples, the processes 500(A), 500(B), 600(A), 600(B), 700 and/or other processes described herein can be performed by the extended reality system 200 shown in FIG. 2, the self-image capturing system 300(A) shown in FIG. 3A, the self-image capturing system 300(B) shown in FIG. 3B, the multi-user self-image capturing system 622 shown in FIG. 6C, and/or one or more computing devices with the computing device architecture 1000 shown in FIG. 1000. In some cases, such a computing device or apparatus may include a processor, microprocessor, microcomputer, or other component of a device that is configured to carry out the steps of the processes 500(A), 500(B), 600(A), 600(B), 700. In some examples, such computing device or apparatus may include one or more sensors configured to capture image data. For example, the computing device can include a smartphone, a camera, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The processes 500(A), 500(B), 600(A), 600(B), 700 are illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 500(A), 500(B), 600(A), 600(B), 700 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
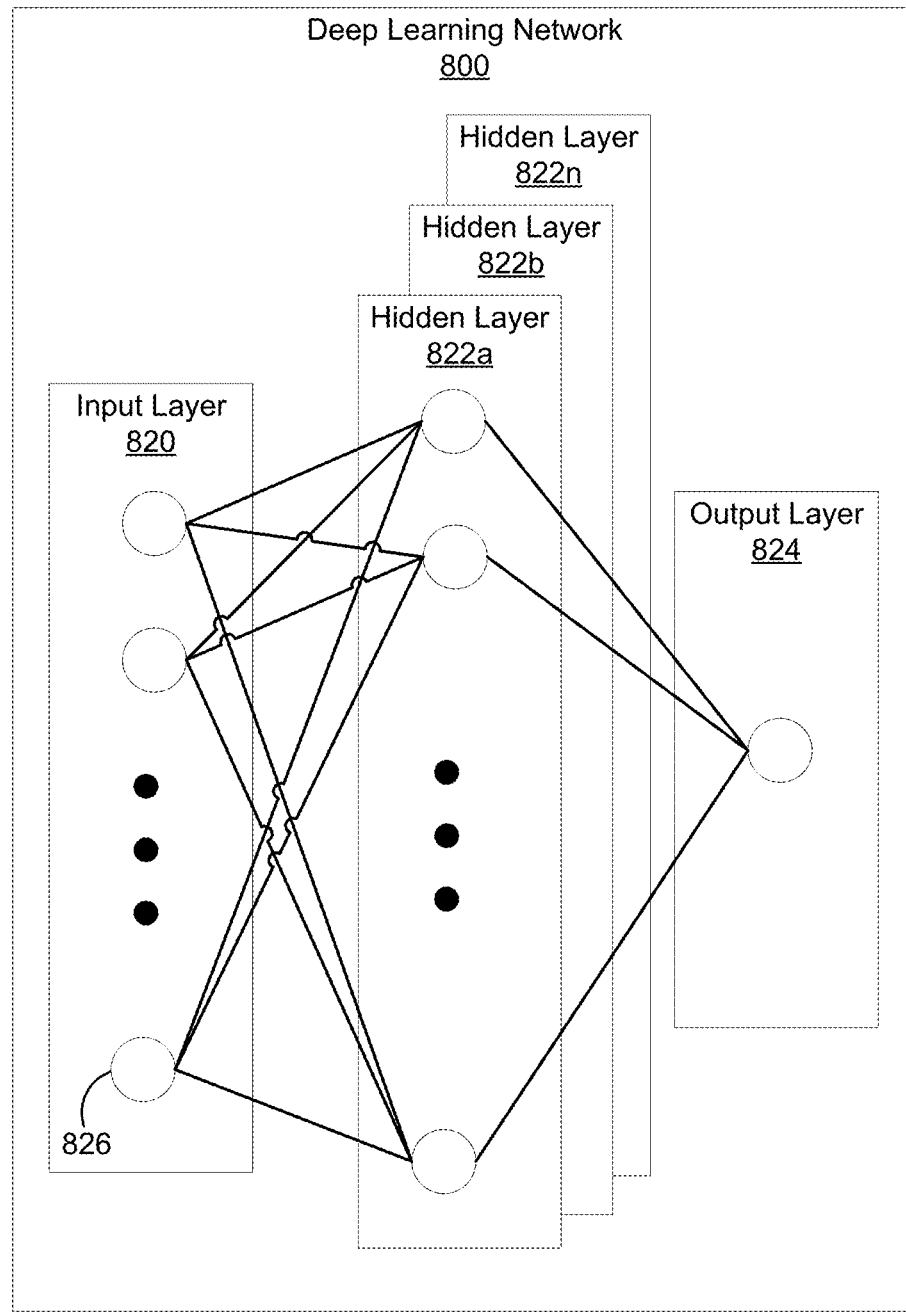
FIG. 8 is a diagram illustrating an example of a deep learning neural network, in accordance with some examples.

FIG. 8 is an illustrative example of a deep learning neural network 800 that can be used by a light estimator. An input layer 820 includes input data. In one illustrative example, the input layer 820 can include data representing the pixels of an input frame. The neural network 800 includes multiple hidden layers 822a, 822b, through 822n. The hidden layers 822a, 822b, through 822n include "n" number of hidden layers, where "n" is an integer greater than or equal to one. The number of hidden layers can be made to include as many layers as needed for the given application. The neural network 800 further includes an output layer 824 that provides an output resulting from the processing performed by the hidden layers 822a, 822b, through 822n. In one illustrative example, the output layer 824 can provide a light estimation associated light a frame. The light estimation can include lighting parameters and/or latent feature vectors.

The neural network 800 is a multi-layer neural network of interconnected nodes. Each node can represent a piece of information. Information associated with the nodes is shared among the different layers and each layer retains information as information is processed. In some cases, the neural network 800 can include a feed-forward network, in which case there are no feedback connections where outputs of the network are fed back into itself. In some cases, the neural network 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822a. For example, as shown, each of the input nodes of the input layer 820 is connected to each of the nodes of the first hidden layer 822a. The nodes of the hidden layers 822a, 822b, through 822n can transform the information of each input node by applying activation functions to these information. The information derived from the transformation can then be passed to and can activate the nodes of the next hidden layer 822b, which can perform their own designated functions. Example functions include convolutional, up-sampling, data transformation, and/or any other suitable functions. The output of the hidden layer 822b can then activate nodes of the next hidden layer, and so on. The output of the last hidden layer 822n can activate one or more nodes of the output layer 824, at which an output is provided. In some cases, while nodes (e.g., node 826) in the neural network 800 are shown as having multiple output lines, a node has a single output and all lines shown as being output from a node represent the same output value.

In some cases, each node or interconnection between nodes can have a weight that is a set of parameters derived from the training of the neural network 800. Once the neural network 800 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 800 to be adaptive to inputs and able to learn as more and more data is processed.

The neural network 800 is pre-trained to process the features from the data in the input layer 820 using the different hidden layers 822a, 822b, through 822n in order to provide the output through the output layer 824. In an example in which the neural network 800 is used to identify objects in images, the neural network 800 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 800 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 800 is trained well enough so that the weights of the layers are accurately tuned.

For the example of identifying objects in images, the forward pass can include passing a training image through the neural network 800. The weights are initially randomized before the neural network 800 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 800, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 800 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 800 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 800 can include any suitable deep network. One example includes a convolutional neural network (CNN), which includes an input layer and an output layer, with multiple hidden layers between the input and out layers. An example of a CNN is described below with respect to FIG. 8. The hidden layers of a CNN include a series of convolutional, nonlinear, pooling (for downsampling), and fully connected layers. The neural network 800 can include any other deep network other than a CNN, such as an autoencoder, a deep belief nets (DBNs), a Recurrent Neural Networks (RNNs), among others.

Figure 9:
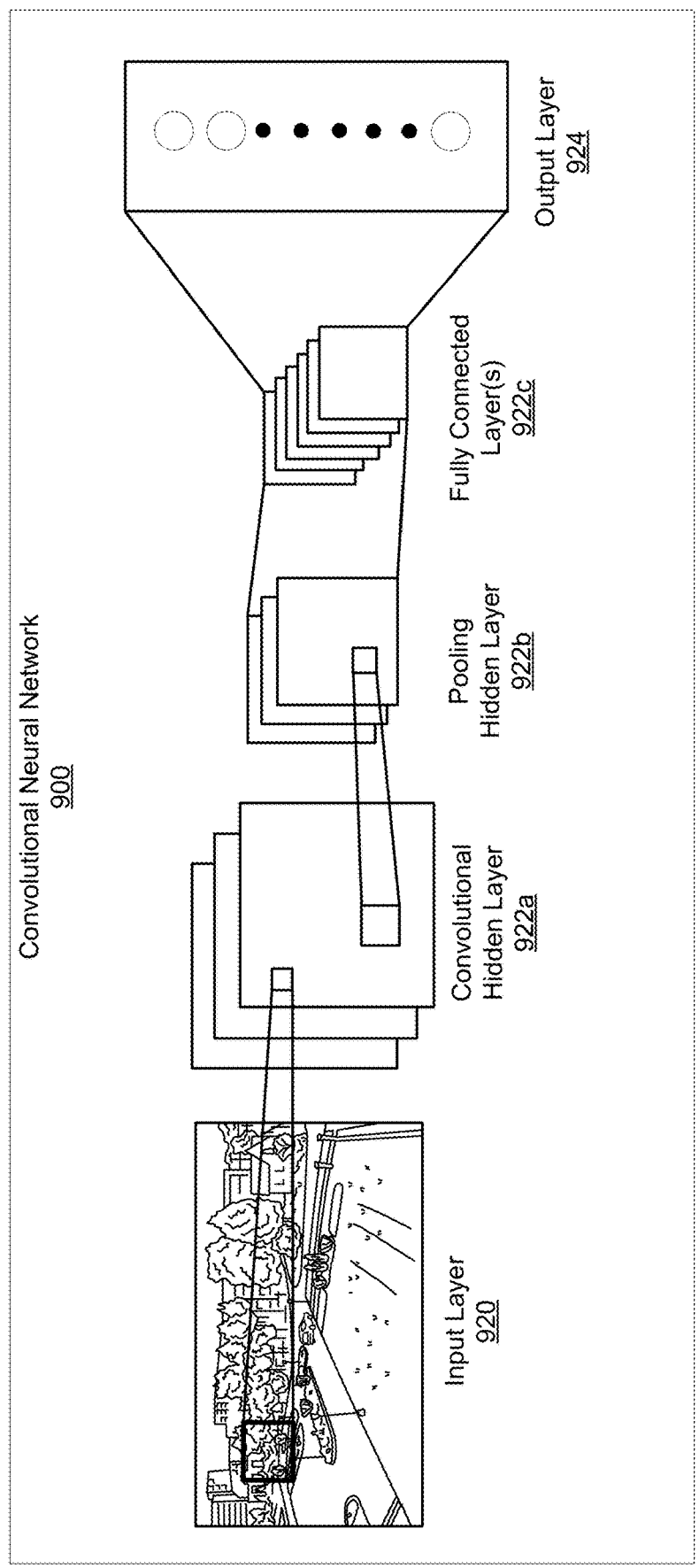
FIG. 9 is a diagram illustrating an example of a convolutional neural network, in accordance with some examples.

FIG. 9 is an illustrative example of a convolutional neural network 900 (CNN 900). The input layer 920 of the CNN 900 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 922a, an optional non-linear activation layer, a pooling hidden layer 922b, and fully connected hidden layers 922c to get an output at the output layer 924. While only one of each hidden layer is shown in FIG. 9, one of ordinary skill will appreciate that multiple convolutional hidden layers, non-linear layers, pooling hidden layers, and/or fully connected layers can be included in the CNN 900. As previously described, the output can indicate a single class of an object or can include a probability of classes that best describe the object in the image.

The first layer of the CNN 900 is the convolutional hidden layer 922a. The convolutional hidden layer 922a analyzes the image data of the input layer 920. Each node of the convolutional hidden layer 922a is connected to a region of nodes (pixels) of the input image called a receptive field. The convolutional hidden layer 922a can be considered as one or more filters (each filter corresponding to a different activation or feature map), with each convolutional iteration of a filter being a node or neuron of the convolutional hidden layer 922a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 922a. Each connection between a node and a receptive field for that node learns a weight and, in some cases, an overall bias such that each node learns to analyze its particular local receptive field in the input image. Each node of the hidden layer 922a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 922a is due to each node of the convolutional layer being applied to its corresponding receptive field. For example, a filter of the convolutional hidden layer 922a can begin in the top-left corner of the input image array and can convolve around the input image. As noted above, each convolutional iteration of the filter can be considered a node or neuron of the convolutional hidden layer 922a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 922a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 922a.

The mapping from the input layer to the convolutional hidden layer 922a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 922a can include several activation maps in order to identify multiple features in an image. The example shown in FIG. 9 includes three activation maps. Using three activation maps, the convolutional hidden layer 922a can detect three different kinds of features, with each feature being detectable across the entire image.

In some examples, a non-linear hidden layer can be applied after the convolutional hidden layer 922a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 900 without affecting the receptive fields of the convolutional hidden layer 922a.

The pooling hidden layer 922b can be applied after the convolutional hidden layer 922a (and after the non-linear hidden layer when used). The pooling hidden layer 922b is used to simplify the information in the output from the convolutional hidden layer 922a. For example, the pooling hidden layer 922b can take each activation map output from the convolutional hidden layer 922a and generates a condensed activation map (or feature map) using a pooling function. Max-pooling is one example of a function performed by a pooling hidden layer. Other forms of pooling functions be used by the pooling hidden layer 922a, such as average pooling, L2-norm pooling, or other suitable pooling functions. A pooling function (e.g., a max-pooling filter, an L2-norm filter, or other suitable pooling filter) is applied to each activation map included in the convolutional hidden layer 922a. In the example shown in FIG. 9, three pooling filters are used for the three activation maps in the convolutional hidden layer 922a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 922a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 922a having a dimension of 24×24 nodes, the output from the pooling hidden layer 922b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 900.

The final layer of connections in the network is a fully-connected layer that connects every node from the pooling hidden layer 922b to every one of the output nodes in the output layer 924. Using the example above, the input layer includes 28×28 nodes encoding the pixel intensities of the input image, the convolutional hidden layer 922a includes 3×24×24 hidden feature nodes based on application of a 5×5 local receptive field (for the filters) to three activation maps, and the pooling layer 922b includes a layer of 3×12×12 hidden feature nodes based on application of max-pooling filter to 2×2 regions across each of the three feature maps. Extending this example, the output layer 924 can include ten output nodes. In such an example, every node of the 3×12×12 pooling hidden layer 922b is connected to every node of the output layer 924.

The fully connected layer 922c can obtain the output of the previous pooling layer 922b (which should represent the activation maps of high-level features) and determines the features that most correlate to a particular class. For example, the fully connected layer 922c layer can determine the high-level features that most strongly correlate to a particular class, and can include weights (nodes) for the high-level features. A product can be computed between the weights of the fully connected layer 922c and the pooling hidden layer 922b to obtain probabilities for the different classes. For example, if the CNN 900 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 924 can include an M-dimensional vector (in the prior example, M=10), where M can include the number of classes that the program has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 10:
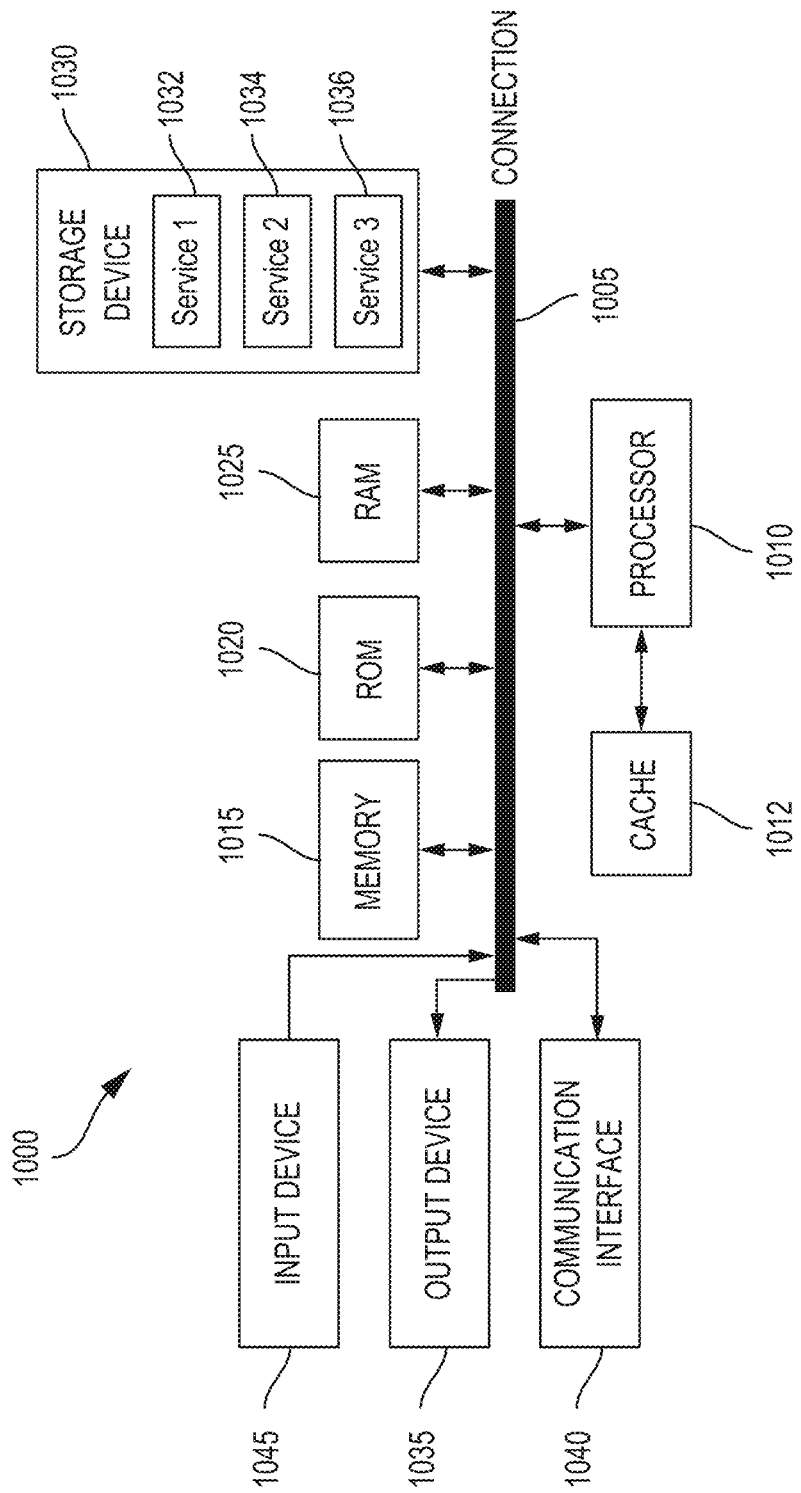
FIG. 10 is a diagram illustrating an example of a system for implementing certain aspects described herein.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some examples, computing system 1000 is a distributed system in which the functions described in this disclosure can be distributed within a datacenter, multiple data centers, a peer network, etc. In some examples, one or more of the described system components represents many such components each performing some or all of the function for which the component is described. In some cases, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC)

wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some examples, a hardware service that performs a particular function can include the software component stored in a computer-readable medium in connection with the necessary hardware components, such as processor 1010, connection 1005, output device 1035, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, operations, steps, or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein can also be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm operations described in connection with the examples disclosed herein may be implemented as electronic hardware, computer software, firmware, or combinations thereof. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of this disclosure are as follows:

Aspect 1: An apparatus for capturing self-images in extended reality environments, the apparatus comprising: a memory; and one or more processors coupled to the memory, the one or more processors being configured to: capture a pose of a user of an extended reality system, the pose of the user including a location of the user within a real-world environment associated with the extended reality system; generate a digital representation of the user, the digital representation of the user reflecting the pose of the user; capture one or more frames of the real-world environment; and overlay the digital representation of the user onto the one or more frames of the real-world environment.

Aspect 2: The apparatus of claim 1, wherein the one or more processors are configured to overlay the digital representation of the user onto the one or more frames of the real-world environment in a frame location corresponding to the location of the user within the real-world environment.

Aspect 3: The apparatus of claim 1, wherein the one or more processors are configured to generate the digital representation of the user before capturing the one or more frames of the real-world environment.

Aspect 4: The apparatus of any one of claims 1 to 3, wherein the one or more processors are configured to display, within a display of the extended reality system through which the real-world environment is visible, the digital representation of the user in a display location corresponding to the location of the user within the real-world environment.

Aspect 5: The apparatus of claim 4, wherein the one or more processors are configured to: detect user input corresponding to an instruction to capture the one or more frames of the real-world environment while the digital representation of the user is displayed within the display of the extended reality system; and capture the one or more frames of the real-world environment based on the user input.

Aspect 6: The apparatus of claim 1, wherein the one or more processors are configured to capture the one or more frames of the real-world environment before capturing the pose of the user.

Aspect 7: The apparatus of claim 6, wherein the one or more processors are configured to display, within a display of the extended reality system on which the one or more frames of the real-world environment are displayed, the digital representation of the user in a display location corresponding to the location of the user within the real-world environment.

Aspect 8: The apparatus of claim 7, wherein the one or more processors are configured to update the display location of the digital representation of the user based on detecting a change in the location of the user within the real-world environment.

Aspect 9: The apparatus of claim 7, wherein the one or more processors are further configured to: detect user input corresponding to an instruction to capture the pose of the user while the digital representation of the user is displayed within the display of the extended reality system; and capture the pose of the user based on the user input.

Aspect 10: The apparatus of any one of claims 1 to 9, wherein the one or more processors are configured to: generate a first digital representation of the user of a first fidelity; and obtain a second digital representation of the user of a second fidelity, wherein the second fidelity is higher than the first fidelity.

Aspect 11: The apparatus of claim 10, wherein the one or more processors are configured to: display the first digital representation of the user within a display of the extended reality system before the pose of the user is captured; generate the second digital representation of the user based on the pose of the user being captured; and overlay the second digital representation of the user onto the one or more frames of the real-world environment.

Aspect 12: The apparatus of claim 10, wherein the one or more processors are configured to: display the first digital representation of the user within a display of the extended reality system before the one or more frames of the real-world environment are captured; generate the second digital representation of the user based on the one or more frames of the real-world environment being captured; and overlay the second digital representation of the user onto the one or more frames of the real-world environment.

Aspect 13: The apparatus of claim 10, wherein the first digital representation is based on a first machine learning algorithm and the second digital representation of the user is based on a second machine learning algorithm.

Aspect 14: The apparatus of claim 13, wherein the one or more processors are configured to: generate the first digital representation of the user based on implementing the first machine learning algorithm on the extended reality system; and cause a server configured to generate digital representations of users to generate the second digital representation of the user based on implementing the second machine learning algorithm.

Aspect 15: The apparatus of any one of claims 1 to 14, wherein the one or more processors are configured to: capture a pose of a person within the real-world environment; generate a digital representation of the person, the digital representation of the person reflecting the pose of the person; and overlay the digital representation of the user and the digital representation of the person onto the one or more frames of the real-world environment.

Aspect 16: The apparatus of claim 15, wherein the one or more processors are configured to generate the digital representation of the person based at least in part on information associated with the digital representation of the person received from an extended reality system of the person.

Aspect 17: The apparatus of claim 16, wherein the information associated with the digital representation of the person includes a machine learning model trained to generate digital representations of the person.

Aspect 18: The apparatus of any one of claims 1 to 17, wherein the one or more processors are configured to: capture a plurality of poses of the user associated with a plurality of frames; generate a plurality of digital representations of the user corresponding to the plurality of frames; and overlay the plurality of digital representations of the user onto the one or more frames of the real-world environment, the one or more frames of the real-world environment including a plurality of frames of the real-world environment.

Aspect 19: The apparatus of any one of claims 1 to 18, wherein the one or more processors are configured to: generate the digital representation of the user using a first machine learning algorithm; and overlay the digital representation of the user onto the one or more frames of the real-world environment using a second machine learning algorithm.

Aspect 20: The apparatus of any one of claims 1 to 19, wherein the one or more processors are configured to capture the pose of the user based at least in part on image data captured by an inward-facing camera system of the extended reality system.

Aspect 21: The apparatus of any one of claims 1 to 20, wherein the one or more processors are configured to capture the pose of the user based at least in part on determining an expression of the user.

Aspect 22: The apparatus of any one of claims 1 to 21, wherein the one or more processors are configured to capture the pose of the user based at least in part on determining a gesture of the user.

Aspect 23: The apparatus of any one of claims 1 to 22, wherein the one or more processors are configured to determine the location of the user within the real-world environment based at least in part on generating a three-dimensional map of the real-world environment.

Aspect 24: The apparatus of any one of claims 1 to 23, wherein the one or more processors are configured to capture the one or more frames of the real-world environment using an outward-facing camera system of the extended reality system.

Aspect 25: The apparatus of any one of claims 1 to 24, wherein the apparatus includes the extended reality system.

Aspect 26: The apparatus of any one of claims 1 to 25, wherein the apparatus includes a mobile device.

Aspect 27: The apparatus of any one of claims 1 to 26, further comprising a display.

Aspect 28: A method for capturing self-images in extended reality environments, the method comprising: capturing a pose of a user of an extended reality system, the pose of the user including a location of the user within a real-world environment associated with the extended reality system; generating a digital representation of the user, the digital representation of the user reflecting the pose of the user; capturing one or more frames of the real-world environment; and overlaying the digital representation of the user onto the one or more frames of the real-world environment.

Aspect 29: The method of claim 28, wherein overlaying the digital representation of the user onto the one or more frames of the real-world environment includes overlaying the digital representation of the user in a frame location corresponding to the location of the user within the real-world environment.

Aspect 30: The method of claim 28, wherein generating the digital representation of the user is performed before capturing the one or more frames of the real-world environment.

Aspect 31: The method of any one of claims 28 to 30, further comprising displaying, within a display of the extended reality system through which the real-world environment is visible, the digital representation of the user in a display location corresponding to the location of the user within the real-world environment.

Aspect 32: The method of claim 31, wherein capturing the one or more frames of the real-world environment further comprises: detecting user input corresponding to an instruction to capture the one or more frames of the real-world environment while the digital representation of the user is displayed within the display of the extended reality system; and capturing the one or more frames of the real-world environment based on the user input.

Aspect 33: The method of claim 28, wherein capturing the one or more frames of the real-world environment is performed before capturing the pose of the user.

Aspect 34: The method of claim 33, further comprising displaying, within a display of the extended reality system on which the one or more frames of the real-world environment are displayed, the digital representation of the user in a display location corresponding to the location of the user within the real-world environment.

Aspect 35: The method of claim 34, further comprising updating the display location of the digital representation of the user based on detecting a change in the location of the user within the real-world environment.

Aspect 36: The method of claim 34, wherein capturing the pose of the user of the extended reality system further comprises: detecting user input corresponding to an instruction to capture the pose of the user while the digital representation of the user is displayed within the display of the extended reality system; and capturing the pose of the user based on the user input.

Aspect 37: The method of any one of claims 28 to 36, wherein generating the digital representation of the user includes: generating a first digital representation of the user of a first fidelity; and obtaining a second digital representation of the user of a second fidelity, wherein the second fidelity is higher than the first fidelity.

Aspect 38: The method of claim 37, further comprising: displaying the first digital representation of the user within a display of the extended reality system before the pose of the user is captured; generating the second digital representation of the user based on the pose of the user being captured; and overlaying the second digital representation of the user onto the one or more frames of the real-world environment.

Aspect 39: The method of claim 37, further comprising: displaying the first digital representation of the user within a display of the extended reality system before the one or more frames of the real-world environment are captured; generating the second digital representation of the user based on the one or more frames of the real-world environment being captured; and overlaying the second digital representation of the user onto the one or more frames of the real-world environment.

Aspect 40: The method of claim 37, wherein the first digital representation is based on a first machine learning algorithm and the second digital representation of the user is based on a second machine learning algorithm.

Aspect 41: The method of claim 40, wherein: generating the first digital representation of the user includes implementing the first machine learning algorithm on the extended reality system; and obtaining the second digital representation of the user includes causing a server configured to generate digital representations of users to generate the second digital representation of the user based on implementing the second machine learning algorithm.

Aspect 42: The method of any one of claims 28 to 41, further comprising: capturing a pose of a person within the real-world environment; generating a digital representation of the person, the digital representation of the person reflecting the pose of the person; and overlaying the digital representation of the user and the digital representation of the person onto the one or more frames of the real-world environment.

Aspect 43: The method of claim 42, wherein the digital representation of the person is generated based at least in part on information associated with the digital representation of the person received from an extended reality system of the person.

Aspect 44: The method of claim 43, wherein the information associated with the digital representation of the person includes a machine learning model trained to generate digital representations of the person.

Aspect 45: The method of any one of claims 28 to 44, further comprising: capturing a plurality of poses of the user associated with a plurality of frames; generating a plurality of digital representations of the user corresponding to the plurality of frames; and overlaying the plurality of digital representations of the user onto the one or more frames of the real-world environment, the one or more frames of the real-world environment including a plurality of frames of the real-world environment.

Aspect 46: The method of any one of claims 28 to 45, wherein: generating the digital representation of the user includes using a first machine learning algorithm; and overlaying the digital representation of the user onto the one or more frames of the real-world environment includes using a second machine learning algorithm.

Aspect 47: The method of any one of claims 28 to 46, wherein capturing the pose of the user includes capturing image data using an inward-facing camera system of the extended reality system.

Aspect 48: The method of any one of claims 28 to 47, wherein capturing the pose of the user includes determining an expression of the user.

Aspect 49: The method of any one of claims 28 to 48, wherein capturing the pose of the user includes determining a gesture of the user.

Aspect 50: The method of any one of claims 28 to 49, further comprising determining the location of the user within the real-world environment based at least in part on generating a three-dimensional map of the real-world environment.

Aspect 51: The method of any one of claims 28 to 50, wherein capturing the one or more frames of the real-world environment includes capturing image data using an outward-facing camera system of the extended reality system.

Aspect 52: A non-transitory computer-readable storage medium for capturing self-images in extended reality environments, the non-transitory computer-readable storage medium comprising instructions stored therein which, when executed by one or more processors, cause the one or more processors to perform operations according to any of aspects 1 to 51.

Aspect 53: An apparatus for capturing self-images in extended reality environments, the apparatus comprising means for performing operations according to any of aspects 1 to 51.

What is claimed is:

1. An apparatus for capturing self-images in extended reality environments, the apparatus comprising:
a memory; and
one or more processors coupled to the memory, the one or more processors being configured to:
capture a pose of a user of an extended reality system, the pose of the user including a location of the user within a portion of a real-world environment associated with the extended reality system;
generate a digital avatar representation of the user, the digital avatar representation of the user reflecting the pose of the user;
capture one or more frames of the portion of the real-world environment without the user in the one or more frames; and
overlay the digital avatar representation of the user onto the one or more frames of the portion of the real-world environment without the user in the one or more frames in a frame location corresponding to the location of the user within the portion of the real-world environment associated with the captured pose, wherein the digital avatar representation is static as the user moves within the real-world environment to capture the one or more frames of the portion of the real-world environment without the user in the one or more frames.

2. The apparatus of claim 1, wherein the one or more processors are configured to generate the digital avatar representation of the user before capturing the one or more frames of the portion of the real-world environment.

3. The apparatus of claim 2, wherein, to overlay the digital avatar representation of the user onto the one or more frames, the one or more processors are configured to display, within a display of the extended reality system through which the real-world environment is visible, the digital avatar representation of the user in the frame location corresponding to the location of the user within the portion of the real-world environment.

4. The apparatus of claim 3, wherein the one or more processors are configured to:
detect user input corresponding to an instruction to capture the one or more frames of the portion of the real-world environment while the digital avatar representation of the user is displayed within the display of the extended reality system; and
capture the one or more frames of the portion of the real-world environment based on the user input.

5. The apparatus of claim 1, wherein the one or more processors are configured to capture the one or more frames of the portion of the real-world environment before capturing the pose of the user.

6. The apparatus of claim 5, wherein, to overlay the digital avatar representation of the user onto the one or more frames, the one or more processors are configured to display, within a display of the extended reality system on which the one or more frames of the portion of the real-world environment are displayed, the digital avatar representation of the user in the frame location corresponding to the location of the user within the portion of the real-world environment.

7. The apparatus of claim 6, wherein the one or more processors are configured to update the frame location of the digital avatar representation of the user based on detecting a change in the location of the user within the portion of the real-world environment.

8. The apparatus of claim 6, wherein the one or more processors are further configured to:
detect user input corresponding to an instruction to capture the pose of the user while the digital avatar representation of the user is displayed within the display of the extended reality system; and
capture the pose of the user based on the user input.

9. The apparatus of claim 1, wherein the one or more processors are configured to:

generate a first digital avatar representation of the user of a first fidelity; and obtain a second digital avatar representation of the user of a second fidelity, wherein the second fidelity is higher than the first fidelity.

10. The apparatus of claim 9, wherein the one or more processors are configured to:

display the first digital avatar representation of the user within a display of the extended reality system before the pose of the user is captured;

generate the second digital avatar representation of the user based on the pose of the user being captured; and overlay the second digital avatar representation of the user onto the one or more frames of the portion of the real-world environment.

11. The apparatus of claim 9, wherein the one or more processors are configured to:

display the first digital avatar representation of the user within a display of the extended reality system before the one or more frames of the portion of the real-world environment are captured;

generate the second digital avatar representation of the user based on the one or more frames of the portion of the real-world environment being captured; and overlay the second digital avatar representation of the user onto the one or more frames of the portion of the real-world environment.

12. The apparatus of claim 9, wherein the first digital avatar representation is based on a first machine learning algorithm and the second digital avatar representation of the user is based on a second machine learning algorithm.

13. The apparatus of claim 12, wherein the one or more processors are configured to:

generate the first digital avatar representation of the user based on implementing the first machine learning algorithm on the extended reality system; and cause a server configured to generate digital avatar representations of users to generate the second digital avatar representation of the user based on implementing the second machine learning algorithm.

14. The apparatus of claim 1, wherein the one or more processors are configured to:

capture a pose of a person within the portion of the real-world environment;

generate a digital avatar representation of the person, the digital avatar representation of the person reflecting the pose of the person; and overlay the digital avatar representation of the user and the digital avatar representation of the person onto the one or more frames of the portion of the real-world environment.

15. The apparatus of claim 14, wherein the one or more processors are configured to generate the digital avatar representation of the person based at least in part on information associated with the digital avatar representation of the person received from an extended reality system of the person.

16. The apparatus of claim 15, wherein the information associated with the digital avatar representation of the person includes a machine learning model trained to generate digital avatar representations of the person.

17. The apparatus of claim 1, wherein the one or more processors are configured to:

capture a plurality of poses of the user associated with a plurality of frames;

generate a plurality of digital avatar representations of the user corresponding to the plurality of frames; and overlay the plurality of digital avatar representations of the user onto the one or more frames of the portion of the real-world environment, the one or more frames of the portion of the real-world environment including a plurality of frames of the portion of the real-world environment.

18. The apparatus of claim 1, wherein the one or more processors are configured to:

generate the digital avatar representation of the user using a first machine learning algorithm; and overlay the digital avatar representation of the user onto the one or more frames of the portion of the real-world environment using a second machine learning algorithm.

19. The apparatus of claim 1, wherein the one or more processors are configured to capture the pose of the user based at least in part on image data captured by an inward-facing camera system of the extended reality system.

20. The apparatus of claim 1, wherein the one or more processors are configured to capture the pose of the user based at least in part on determining an expression of the user.

21. The apparatus of claim 1, wherein the one or more processors are configured to capture the pose of the user based at least in part on determining a gesture of the user.

22. The apparatus of claim 1, wherein the one or more processors are configured to determine the location of the user within the real-world environment based at least in part on generating; a three-dimensional map of the real-world environment.

23. The apparatus of claim 1, wherein the one or more processors are configured to capture the one or more frames of the portion of the real-world environment using an outward-facing camera system of the extended reality system.

24. The apparatus of claim 1, wherein the apparatus includes the extended reality system.

25. The apparatus of claim 1, wherein the apparatus includes a mobile device.

26. The apparatus of claim 1, further comprising a display.

27. The apparatus of claim 1, wherein the location of the digital avatar representation, that is overlaid onto the one or more frames of the portion of the real-world environment without the user in the one or more frames, is adjusted to account for movement as the user moves within the real-world environment.

28. A method for capturing self-images in extended reality environments, the method comprising:

capturing a pose of a user of an extended reality system; the pose of the user including a location of the user within a portion of a real-world environment associated with the extended reality system;

generating a digital avatar representation of the user, the digital avatar representation of the user reflecting the pose of the user;

capturing one or more frames of the portion of the real-world environment without the user in the one or more frames; and overlaying the digital avatar representation of the user onto the one or more frames of the portion of the real-world environment without the user in the one or more frames in a frame location corresponding to the location of the user within the portion of the real-world environment associated with the captured pose, wherein the digital avatar representation is static as the user moves within the real-world environment to capture the one or more frames of the portion of the real-world environment without the user in the one or more frames.

29. The method of claim 28, wherein generating the digital avatar representation of the user is performed before capturing the one or more frames of the portion of the real-world environment.

30. The method of claim 29, wherein overlaying the digital avatar representation of the user onto the one or more frames includes displaying, within a display of the extended reality system through which the real-world environment is visible, the digital avatar representation of the user in the frame location corresponding to the location of the user within the portion of the real-world environment.

31. The method of claim 30, wherein capturing the one or more frames of the portion of the real-world environment further comprises:
  detecting user input corresponding to an instruction to capture the one or more frames of the portion of the real-world environment while the digital avatar representation of the user is displayed within the display of the extended reality system; and
  capturing the one or more frames of the portion of the real-world environment based on the user input.

32. The method of claim 28, wherein capturing the one or more frames of the portion of the real-world environment is performed before capturing the pose of the user.

33. The method of claim 32, wherein overlaying the digital avatar representation of the user onto the one or more frames includes displaying, within a display of the extended reality system on which the one or more frames of the portion of the real-world environment are displayed, the digital avatar representation of the user in the frame location corresponding to the location of the user within the portion of the real-world environment.

34. The method of claim 33, further comprising updating the frame location of the digital avatar representation of the user based on detecting a change in the location of the user within the portion of the real-world environment.

35. The method of claim 33, wherein capturing the pose of the user of the extended reality system further comprises:
  detecting user input corresponding to an instruction to capture the pose of the user while the digital avatar representation of the user is displayed within the display of the extended reality system; and
  capturing the pose of the user based on the user input.

36. The method of claim 28, wherein generating the digital avatar representation of the user includes:
  generating a first digital avatar representation of the user of a first fidelity; and
  obtaining a second digital avatar representation of the user of a second fidelity, wherein the second fidelity is higher than the first fidelity.

37. The method of claim 36, further comprising:
  displaying the first digital avatar representation of the user within a display of the extended reality system before the pose of the user is captured;
  generating the second digital avatar representation of the user based on the pose of the user being captured; and
  overlaying the second digital avatar representation of the user onto the one or more frames of the portion of the real-world environment.

38. The method of claim 36, further comprising:
  displaying the first digital avatar representation of the user within a display of the extended reality system before the one or more frames of the portion of the real-world environment are captured;
  generating the second digital avatar representation of the user based on the one or more frames of the portion of the real-world environment being captured; and
  overlaying the second digital avatar representation of the user onto the one or more frames of the portion of the real-world environment.

39. The method of claim 36, wherein the first digital avatar representation is based on a first machine learning algorithm and the second digital avatar representation of the user is based on a second machine learning algorithm.

40. The method of claim 39, wherein:
  generating the first digital avatar representation of the user includes implementing the first machine learning algorithm on the extended reality system; and
  obtaining the second digital avatar representation of the user includes causing a server configured to generate digital avatar representations of users to generate the second digital avatar representation of the user based on implementing the second machine learning algorithm.

41. The method of claim 28, further comprising:
  capturing a pose of a person within the portion of the real-world environment;
  generating a digital avatar representation of the person, the digital avatar representation of the person reflecting the pose of the person; and
  overlaying the digital avatar representation of the user and the digital avatar representation of the person onto the one or more frames of the portion of the real-world environment.

42. The method of claim 41, wherein the digital avatar representation of the person is generated based at least in part on information associated with the digital avatar representation of the person received from an extended reality system of the person.

43. The method of claim 42, wherein the information associated with the digital avatar representation of the person includes a machine learning model trained to generate digital avatar representations of the person.

44. The method of claim 28, further comprising:
  capturing a plurality of poses of the user associated with a plurality of frames;
  generating a plurality of digital avatar representations of the user corresponding to the plurality of frames; and
  overlaying the plurality of digital avatar representations of the user onto the one or more frames of the portion of the real-world environment, the one or more frames of the portion of the real-world environment including a plurality of frames of the portion of the real-world environment.

45. The method of claim 28, wherein:
  generating the digital avatar representation of the user includes using a first machine learning algorithm; and
  overlaying the digital avatar representation of the user onto the one or more frames of the portion of the real-world environment includes using a second machine learning algorithm.

46. The method of claim 28, wherein capturing the pose of the user includes capturing image data using an inward-facing camera system of the extended reality system.

47. The method of claim 28, wherein capturing the pose of the user includes determining an expression of the user.

48. The method of claim 28, wherein capturing the pose of the user includes determining a gesture of the user.

49. The method of claim 28, further comprising determining the location of the user within the real-world environment based at least in part on generating a three-dimensional map of the real-world environment.

50. The method of claim 28, wherein capturing the one or more frames of the portion of the real-world environment includes capturing image data using an outward-facing camera system of the extended reality system.

51. A non-transitory computer-readable storage medium for capturing self-images in extended reality environments, the non-transitory computer-readable storage medium comprising instructions stored therein which, when executed by one or more processors, cause the one or more processors to:
 capture a pose of a user of an extended reality system, the pose of the user including a location of the user within a portion of a real-world environment associated with the extended reality system;
 generate a digital avatar representation of the user, the digital avatar representation of the user reflecting the pose of the user;
 capture one or more frames of the portion of the real-world environment without the user in the one or more frames; and
 overlay the digital avatar representation of the user onto the one or more frames of the portion of the real-world environment without the user in the one or more frames in a frame location corresponding to the location of the user within the portion of the real-world environment associated with the captured pose, wherein the digital avatar representation is static as the user moves within the real-world environment to capture the one or more frames of the portion of real world environment without the user in the one or more frames.

52. The non-transitory computer-readable storage medium of claim 51, wherein the instructions, when executed by the one or more processors, cause the one or more processors to generate the digital avatar representation of the user before capturing the one or more frames of the portion of the real-world environment.

53. The non-transitory computer-readable storage medium of claim 51, wherein the instructions, when executed by the one or more processors, cause the one or more processors to capture the one or more frames of the portion of the real-world environment before capturing the pose of the user.

54. An apparatus for capturing self-images in extended reality environments, the apparatus comprising:
 a memory; and
 one or more processors coupled to the memory, the one or more processors being configured to:
  capture a pose of a user of an extended reality system, the pose of the user including a location of the user within a portion of a real-world environment associated with the extended reality system;
  generate a digital avatar representation of the user, the digital avatar representation of the user reflecting the pose of the user, the digital avatar representation including a first version of the digital avatar representation and a second version of the digital avatar representation, wherein the first version of the digital avatar representation corresponds to the pose of the user;
  capture one or more frames of the portion of the real-world environment without the user in the one or more frames, wherein generating the first version of the digital avatar representation of the user occurs as the one or more frames of the portion of the real-world environment without the user in the one or more frames are being captured; and
  overlay the second version of the digital avatar representation of the user onto the one or more frames of the portion of the real-world environment without the user in the one or more frames.

55. The apparatus of claim 54, wherein the first version of the digital avatar representation is a low-fidelity version, and the second version of the digital avatar representation is a high-fidelity version.

56. The apparatus of claim 54, wherein, to overlay the digital avatar representation of the user onto the one or more frames, the one or more processors are configured to display, within a display of the extended reality system through which the real-world environment is visible, the digital avatar representation of the user in the frame location corresponding to the location of the user within the portion of the real-world environment.

57. The apparatus of claim 56, wherein if the location corresponding to the digital avatar representation is outside of a field-of-view (FOV) of the display of the extended reality system, the digital avatar representation is removed from the display.

58. The apparatus of claim 56, wherein the first version of the digital avatar representation is not displayed within the display of the extended reality system when the second version of the digital avatar representation is selected for the overlay.

59. The apparatus of claim 54, wherein the first version of the digital avatar representation is static as the user moves within the real-world environment to capture the one or more frames of the real-world environment without the user in the one or more frames.

* * * * *